United States Patent
Fujita

(10) Patent No.: US 10,044,906 B2
(45) Date of Patent: Aug. 7, 2018

(54) IMAGE PROCESSING APPARATUS, MEDIUM STORING PROGRAM EXECUTABLE BY IMAGE PROCESSING APPARATUS, AND SYSTEM

(71) Applicant: BROTHER KOGYO KABUSHIKI KAISHA, Nagoya-shi, Aichi-ken (JP)

(72) Inventor: Keisuke Fujita, Nagoya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/440,382

(22) Filed: Feb. 23, 2017

(65) Prior Publication Data

US 2017/0251126 A1 Aug. 31, 2017

(30) Foreign Application Priority Data

Feb. 25, 2016 (JP) ................. 2016-034164

(51) Int. Cl.
*G06F 3/12* (2006.01)
*H04N 1/41* (2006.01)
(Continued)

(52) U.S. Cl.
CPC .......... *H04N 1/41* (2013.01); *H04N 1/00209* (2013.01); *H04N 1/00244* (2013.01); *H04N 1/40062* (2013.01)

(58) Field of Classification Search
None
See application file for complete search history.

(56) References Cited

U.S. PATENT DOCUMENTS

| 2005/0180645 A1 | 8/2005 | Hasegawa et al. |
| 2011/0188078 A1* | 8/2011 | Tonegawa ................. G06F 3/12 |
| | | 358/1.15 |

(Continued)

FOREIGN PATENT DOCUMENTS

| JP | H05-225378 A | 9/1993 |
| JP | 2002-288589 A | 10/2002 |

(Continued)

*Primary Examiner* — Dov Popovici
(74) *Attorney, Agent, or Firm* — Scully, Scott, Murphy & Presser, P.C.

(57) ABSTRACT

An image processing apparatus includes a controller configured to perform: acquiring objective image data, the objective image data being generated by optically reading a manuscript and representing an objective image including a character image indicating a character; determining whether any condition, among conditions including first and second conditions, is satisfied; if the first condition is satisfied, transmitting, to a predetermined communication apparatus, first image data based on the objective image data, the first image data representing the objective image, receiving first processed data from the predetermined communication apparatus; and if the second condition is satisfied, executing, for the objective image data, a predetermined compression processing for reducing size of data representing the character image in the objective image data so as to generate second image data; transmitting the second image data to the predetermined communication apparatus; and receiving second processed data from the predetermined communication apparatus.

14 Claims, 11 Drawing Sheets

(51) Int. Cl.
  *H04N 1/00*    (2006.01)
  *H04N 1/40*    (2006.01)
  *G06K 15/00*   (2006.01)

(56) References Cited

U.S. PATENT DOCUMENTS

2013/0028520 A1    1/2013  Kondo et al.
2016/0072968 A1*   3/2016  Nakamura ......... H04N 1/00241
                                              358/1.15

FOREIGN PATENT DOCUMENTS

| JP | 2005-259017 A | 9/2005 |
| JP | 2008-172475 A | 7/2008 |
| JP | 2013-030090 A | 2/2013 |
| JP | 2015-088773 A | 5/2015 |

* cited by examiner

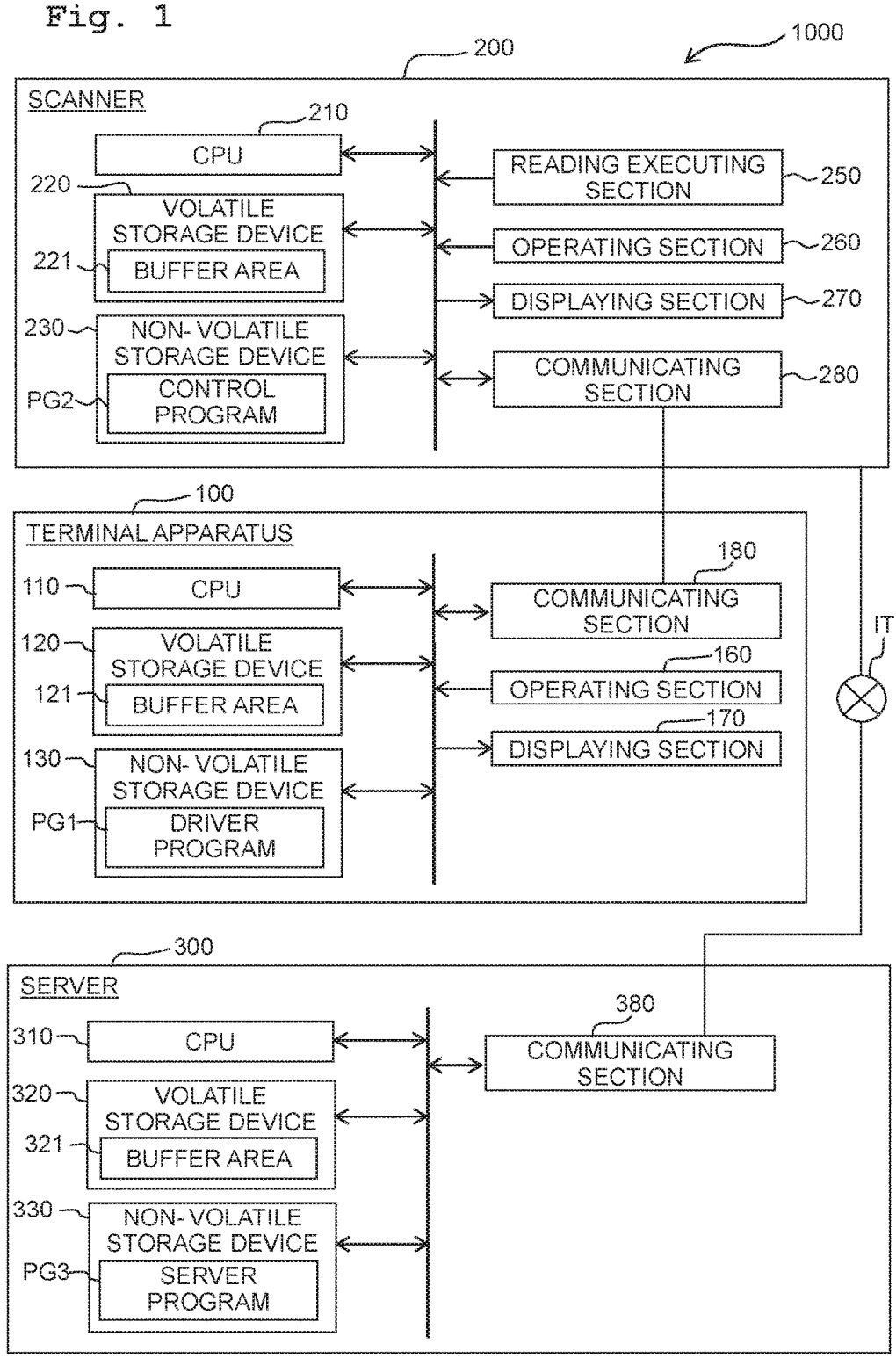

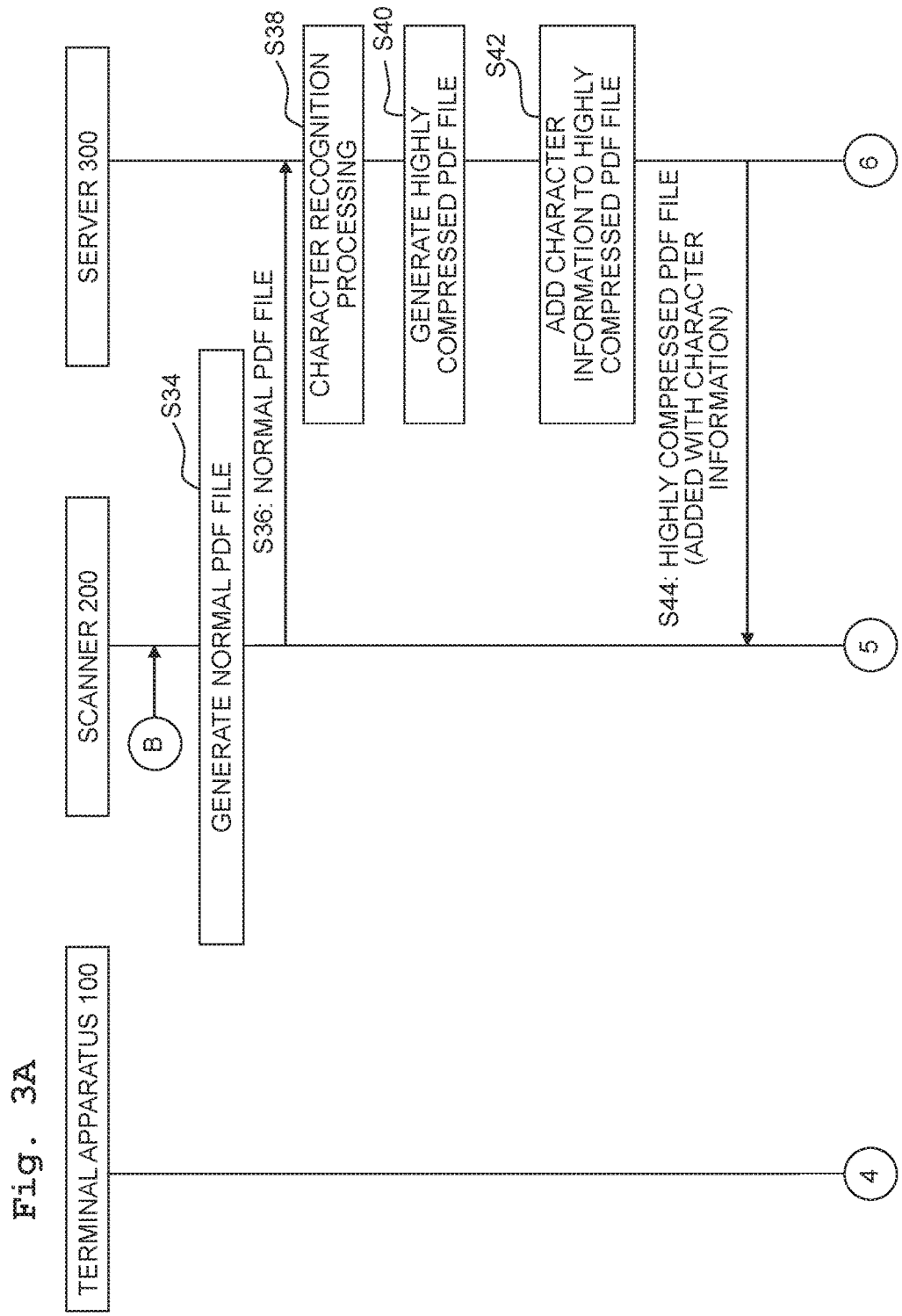

IMAGE PROCESSING APPARATUS, MEDIUM STORING PROGRAM EXECUTABLE BY IMAGE PROCESSING APPARATUS, AND SYSTEM

CROSS REFERENCE TO RELATED APPLICATION

The present application claims priority from Japanese Patent Application No. 2016-034164 filed on Feb. 25, 2016 the disclosure of which is incorporated herein by reference in its entirety.

BACKGROUND

Field of the Invention

The present invention relates to image processing, in particular, to image processing using character recognition processing.

Description of the Related Art

There is known an image processing technique for executing character recognition processing for image data. For example, there is known an image processing apparatus which generates, by using objective image data, a PDF file including a non-character image in which a character portion is removed from an objective image, a binary character image indicating only the character portion, and a character code obtained by executing the character recognition processing for the objective image data.

SUMMARY

In the above-described technique, however, the load required for the character recognition processing, for example the load generated by the processing itself, the load required for transmitting data related to the processing, etc., are not considered. Accordingly, there is such a possibility that there might arise any excessive increase in the resource such as a memory required for the character recognition processing and/or in the processing time, or any excessive decrease or lowering in the processing precision of the character recognition processing.

The present teaching has been made in view of the above-described situation, and an object of the present teaching is to provide a technique capable of suppressing any excessive increase in the resource required for the character recognition processing and/or in the processing time, and capable of suppressing any excessive decrease in the processing precision of the character recognition processing.

According to a first aspect of the present teaching, there is provided an image processing apparatus including a controller configured to perform: acquiring objective image data, the objective image data being generated by optically reading a manuscript and representing an objective image including a character image indicating a character; determining whether any condition, among conditions including a first condition and a second condition, is satisfied; if the first condition is satisfied: transmitting, to a predetermined communication apparatus, first image data based on the objective image data, the first image data representing the objective image, receiving first processed data from the predetermined communication apparatus, the first processed data including first character information regarding the character in the character image, the first character information being generated by executing a character recognition processing for the first image data; and if the second condition is satisfied: executing, for the objective image data, a predetermined compression processing for reducing size of data representing the character image in the objective image data so as to generate second image data, size of the second image data being smaller than size of the first image data, transmitting the second image data to the predetermined communication apparatus, and receiving second processed data from the predetermined communication apparatus, the second processed data including second character information regarding the character in the character image, the second character information being generated by executing the character recognition processing for the second image data.

The time required for transmitting data to the predetermined apparatus becomes longer, as the size of the data to be transmitted is greater. Therefore, in a case that the size of the image data to be transmitted is reduced by the compression processing, the time required for the data transmission can be reduced. On the other hand, in a case that the size of the data representing the character image is reduced by the compression processing, there is such a possibility that the precision of the character recognition processing executed by the predetermined communication apparatus might be lowered. According to the above-described configuration, either one of the first image data, and the second image data which is generated by the predetermined compression processing and of which size is smaller than that of the first image data is transmitted to the predetermined communication apparatus, depending on the condition. As a result, when the image data is transmitted to the predetermined communication apparatus so as to allow the predetermined communication apparatus to execute the character recognition processing, it is possible to appropriately adjust the balance between the time required for transmitting the image data and the processing precision of the character recognition processing. Thus, it is possible to suppress any excessive increase in the time required for causing the predetermined communication apparatus to execute the character recognition processing and to suppress any excessive decrease in the precision of the character recognition processing.

According to a second aspect of the present teaching, there is provided an image processing apparatus including a controller configured to perform: acquiring objective image data generated by optically reading a manuscript, the objective image data representing an objective image including a character image indicating a character; determining whether any condition, among conditions including a first condition and a second condition, is satisfied; if the first condition is satisfied: executing a character recognition processing for the objective image data so as to generate first processed data, the first processed data including first character information regarding the character in the character image, and executing, for the objective image data, a predetermined compression processing for reducing size of data representing the character image in the objective image data so as to generate predetermined compressed data, size of the predetermined compressed data being smaller than size of the objective image data; and if the second condition is satisfied: executing the predetermined compression processing for the objective image data so as to generate the predetermined compressed data, and executing the character recognition processing for the predetermined compressed data so as to generate second processed data, the second processed data including second character information regarding the character in the character image.

In a case that the size of the data representing the character image in the objective image data is reduced by the predetermined compression processing, the resource required for the character recognition processing (for example, the required capacity of the memory) may be reduced. On the other hand, in the case that the size of the data representing the character image in the objective image data is reduced by the predetermined compression processing, there is such a possibility that the recognition precision of the character recognition processing might be lowered. According to the above-described configuration, the character recognition processing is executed either for the objective image data, or for the predetermined compressed data, depending on the condition. As a result, it is possible to appropriately adjust the balance between the resource required for the character recognition processing and the recognition precision of the character recognition processing. Thus, it is possible to suppress any excessive increase in the resource required for the character recognition processing and to suppress any excessive decrease in the precision of the character recognition processing.

Note that the technique disclosed in the specification of the present teaching can be realized by a various kinds of aspects, including for example, a system including an image reading apparatus, a terminal apparatus, a server, an image processing apparatus and a predetermined communication apparatus; an image processing method; a computer program for realizing the function of the apparatuses, the system or the method; a recording medium storing the computer program; and the like.

BRIEF DESCRIPTION OF THE DRAWINGS

FIG. 1 is a block diagram depicting the configuration of a system according to a first embodiment.

FIGS. 3A and 3B depict a part of the flow chart of the file generation processing of the first embodiment.

DESCRIPTION OF THE EMBODIMENTS

[First Embodiment] <Configuration of System 1000>

Figure 2A:
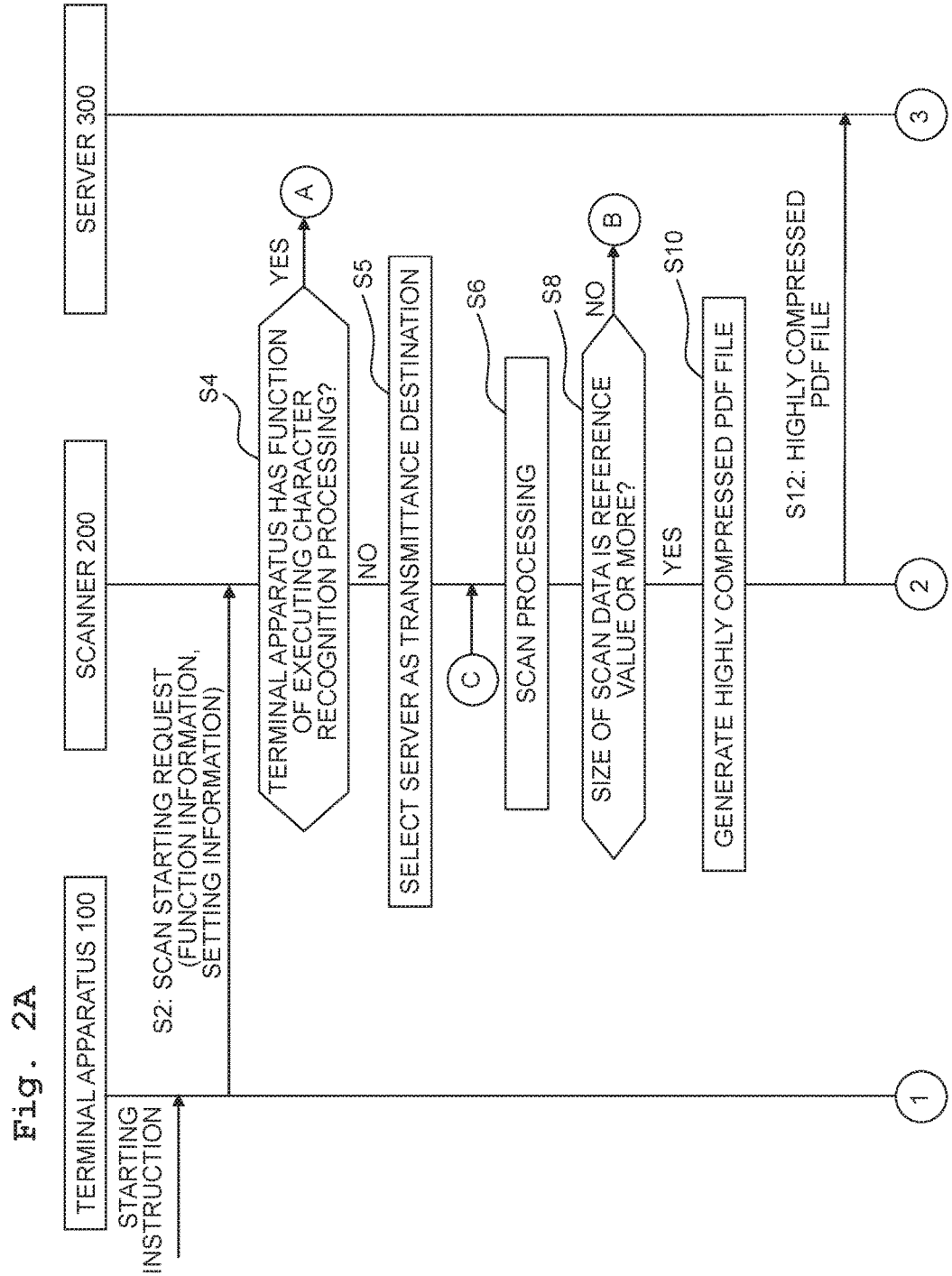
FIGS. 2A and 2B depict a part of a flow chart of a file generation processing of the first embodiment.

A system 1000 as depicted in FIG. 1 includes a terminal apparatus 100, a scanner 200 and a server 300. The scanner 200 is connected to an Internet IT via a wired or wireless LAN (Local Area Network). The terminal apparatus 100 is communicably connected to the scanner 200, via the wired or wireless LAN. Instead of this, the terminal apparatus 100 can be communicably connected to the scanner 200, also via a bus for inter-apparatus connection such as USB (Universal Serial Bus). The server 300 is connected to the Internet IT. As a result, the scanner 200 and the server 300 are capable of communicating with each other via the Internet IT.

The terminal apparatus 100 (FIG. 1) is a terminal apparatus used by a user of the scanner 200; the terminal apparatus 100 is, for example, a personal computer, a smartphone, etc. The terminal apparatus 100 is provided with a CPU 110 as a controller of the terminal apparatus 100; a volatile storage device (volatile memory unit) 120 such as a RAM; a non-volatile storage device (non-volatile memory unit) 130 such as a hard disk drive; an operating section 160 such as a keyboard, a touch panel, etc.; a displaying section 170 such as a liquid crystal display, etc.; and a communicating section 180 configured to perform communication with an external apparatus or device.

The communicating section 180 includes an interface conforming to the Ethernet (trade name) standard and/or the Wi-Fi (trade name) standard, and an interface conforming to the USB standard. The communicating section 180 is used for the communication with the scanner 200.

The volatile storage device 120 provides a buffer area 121 configured to temporarily store a various kinds of intermediate data which are generated when the CPU 110 performs a processing(s). The non-volatile storage device 130 stores a driver program PG1.

The driver program PG1 is a computer program provided by a vendor of the scanner 200, and is provided in a downloadable form from a server connected to the terminal apparatus 100 via the internet IT. Instead of this, the driver program PG1 may be provided in a form stored in a CD-ROM, a DVD-ROM, etc. There are two types of the driver program PG1 provided by the vendor of the scanner 200; one type includes a program for executing a character recognition processing, and the other type does not include the program for executing the character recognition processing. In a case that the driver program PG1 includes the program for executing the character recognition processing, the terminal apparatus 100 has a function of executing the character recognition processing. On the other hand, in a case that the driver program PG1 does not include the program for executing the character recognition processing, the terminal apparatus 100 does not have the function of executing the character recognition processing.

The character recognition processing is a processing for analyzing an image data with a publicly known OCR (Optical Character Reader) technique to thereby generate character information regarding a character within an image. The generated character information includes, for example, a character code which is identification information indicating the character in (within) the image, and position information indicating the position of the character in the image. The character information may further include information indicating the size of the character and information indicating the font of the character.

The CPU 110 executes the driver program PG1 to thereby function as a scanner driver configured to control the scanner 200. For example, the CPU 110 controls the scanner 200 so as to cause the scanner 200 to read a manuscript (original), and to generate a scan data. Further, the CPU 110 cooperates with the server 300 and the scanner 200 so as to realize a file generation processing (to be described later on).

The scanner 200 is provided with a CPU 210; a volatile storage device 220 such as a RAM; a non-volatile storage device 230 such as a hard disk drive, EEPROM, etc.; a reading executing section 250; an operating section 260 such as a touch panel, a button, etc.; a displaying section 270 such as a liquid crystal display superposed on the touch panel, etc.; and a communicating section 280 including an interface configured to perform communication with the external apparatus or device.

The reading executing section 250 generates the scan data by optically reading the manuscript with an image sensor, in accordance with the control by the CPU 210. The reading executing section 250 of the present embodiment is provided with an automatic manuscript conveying section (ADF: Auto Document Feeder) configured to automatically convey a plurality of sheets of manuscript, prepared by the user, one by one with the motive force of a motor.

The communicating section 280 includes an interface conforming to the Ethernet (trade name) standard and/or the Wi-Fi (trade name) standard, and an interface conforming to the USB standard. The communicating section 280 is used for the communication with the above-described server 300 and terminal apparatus 100.

The volatile storage device 220 provides a buffer area 221 configured to temporarily store a various kinds of intermediate data which are generated when the CPU 210 performs a processing(s). The non-volatile storage device 230 stores a control program PG2.

The control program PG2 is provided in a form stored in the non-volatile storage device 130 in advance when the scanner 200 is shipped from the factory by its manufacturer. The control program PG2 may be provided in a downloadable form from a server connected to the scanner 200 via the Internet IT. The control program PG2 does not include a program for executing the character recognition processing, and thus the scanner 200 does not have the function of executing the character recognition processing.

The CPU 210 executes the control program PG2 to thereby function as a controller of the scanner 200. For example, the CPU 210 controls the reading executing section 250 so as to cause the reading executing section 250 to read a manuscript, and to generate a scan data. Further, the CPU 210 cooperates with the server 300 and the terminal apparatus 100 so as to realize the file generation processing (to be described later on).

The server 300 (FIG. 1) is a server provided by the vendor of the scanner 200. The server 300 is provided with a CPU 310 as a controller of the server 300; a volatile storage device 320 such as a RAM; a non-volatile storage device 330 such as a hard disk drive; and a communicating section 380 configured to be connected to the Internet IT.

The volatile storage device 320 provides a buffer area 321 configured to temporarily store a various kinds of intermediate data which are generated when the CPU 310 performs a processing(s). The non-volatile storage device 330 stores a server program PG3. The server program PG3 includes a program for executing the character recognition processing. Accordingly, the server 300 has the function of executing the character recognition processing.

The CPU 310 executes the server program PG3 so as to cooperate with the scanner 200 and the terminal apparatus 100, thereby realizing the file generation processing (to be described in the following).

<File Generation Processing>

The file generation processing depicted in FIGS. 2 to 5 is a processing for generating scan data representing a scan image by reading a manuscript (original) prepared by a user, and for generating an image file representing the scan image by using the scan data. The image file which is generated is a character information-added highly compressed PDF file which is added with character information including a character code indicating a character in the scan image. The highly compressed PDF file includes a compressed character image data representing a character image, and a compressed background image data representing a background image; the highly compressed PDF file is an image file having a format of PDF (Portable Document Format) and representing one piece of a scan image by the character image data and the background image data. The character information added to the generated highly compressed PDF file is used, for example, for allowing the user to search a desired character among the character in the scan image.

The file generation processing is started in a case that a starting instruction to start reading of a manuscript is inputted to the terminal apparatus 100 functioning as the scanner driver. For example, the user places one or more piece(s) of the manuscript on the automatic manuscript conveying section of the scanner 200, specifies the character information-added highly compressed PDF as a storing format in an input screen (omitted in the drawings) of the scanner driver, and then inputs the starting instruction to the terminal apparatus 100.

In a case that the starting instruction is inputted to the terminal apparatus 100, then in step S2, the CPU 110 transmits a scan starting request to the scanner 200. The scan starting request includes function information and setting information. The function information is information describing whether or not the terminal apparatus 100 has the function of executing the character recognition processing. Instead of this, it is also allowable that the function information is information indicating the kind of the driver program PG1. It is sufficient that the function information is information capable of specifying whether the terminal apparatus 100 has the function of executing the character recognition processing. The setting information is information indicating a publicly known setting regarding the scan such as information indicating the resolution of a scan image to be generated.

In a case that the scanner 200 receives the scan starting request and the function information, then the CPU 210 determines, in step S4, whether the terminal apparatus 100 has the function of executing the character recognition processing, based on the function information.

In a case that the terminal apparatus 100 does not have the function of executing the character recognition processing (S4: NO), then the CPU 210 selects, in step S5, the server 300 as a transmittance destination to which a PDF file, before the character recognition processing is executed therefor, is to be transmitted.

In step S6, the CPU 210 controls the reading executing section 250 to execute a scan processing for causing the reading executing section 250 to read one sheet of the manuscript. As a result, scan data as the objective image data of the present embodiment is generated and acquired, and is stored in the buffer area 221. The scan data is bitmap data composed of a plurality of pixels, specifically RGB image data in which the color of each of the pixels is represented by a RGB value. The RGB value of one pixel includes gradation values of three color components that are red (R), green (G) and blue (B) (hereinafter referred also to as "component values"). In the present embodiment, the number of gradation of each component value is 256 gradations.

Figure 6A:
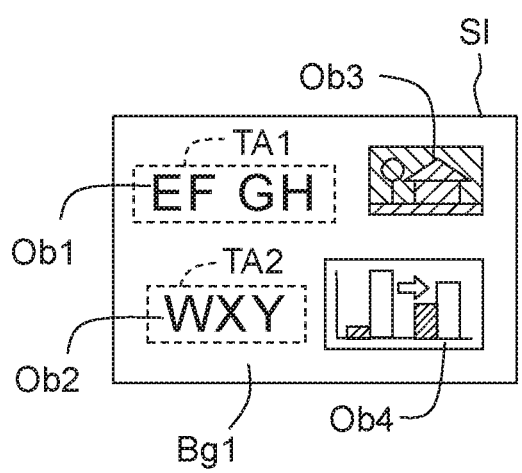
FIGS. 6A to 6C are views each depicting an example of an image used in the first embodiment.

FIG. 6A depicts an example of a scan image SI represented by the scan data, namely an example of the scan image SI as the objective image of the present embodiment. In the scan image SI, a plurality of pixels (not depicted in the drawings) are arranged in a matrix form along the lateral and vertical directions.

The scan image SI includes a background Bg1, and a plurality of objects Ob1 to Ob4. Each of the objects Ob1 and Ob2 is a character. The object Ob3 is a photograph, and the object Ob4 is a drawing. The drawing is an object representing an illustration, a table, a diagram (chart), a pattern, etc.

In step S8, the CPU 210 determines whether the size of the scan data acquired in step S6 is a reference value or more. Here, the size of the scan data means the size of the data amount (for example, unit: byte), rather than the size of the image (number of pixels). Note that, however, as the number of pixels included in the scan image SI is greater, the size (data amount) of the scan data before being subjected to the compression (pre-compression scan data) becomes greater. The number of the pixels differs depending on the resolution and/or the size of the manuscript. For example, the size of a scan data, corresponding to a case that a manuscript of A4 size is read at 1200 dpi, is considered as the reference value.

In a case that the size of the scan data is the reference value or more (S8: YES), then in step S10, the CPU 210 uses the scan data to generate a highly compressed PDF file IFh representing the scan image SI.

A processing for generating the highly compressed PDF file IFh will be explained. The CPU 210 analyses the scan data to thereby execute a character image specification processing for specifying one or more character image(s) including a character within the scan image SI. For example, the CPU 210 applies a publicly known edge detecting filter to the scan data to thereby extract the edge in the scan image, and specifies an area or region, in the scan image, in which the amount of edge is greater than a reference value, as an object area. The CPU 210 specifies, an area which is included in the one or more specified object area(s) and which has a characteristic as the character image, as a character image. The characteristic as the character image includes a smaller number of the colors than a reference value, and a smaller ratio occupied by object pixels, having a color different from that of the background color, than a reference value. Note that as the character image specification processing, it is possible to adopt a various kinds of publicly known methods including, for example, as disclosed in United States Patent Application Publication No. US 2013/0028520, Japanese Patent Application Laid-open No. H05-225378, and Japanese Patent Application Laid-open No. 2002-288589. In the example depicted in FIG. 6A, character images TA1 and TA2 corresponding to the objects Ob1 and Ob2 that are characters, respectively, are specified within the scan image 51.

Figure 6B:
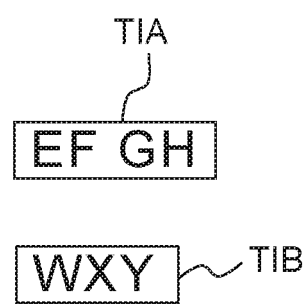

Next, the CPU 210 classifies a plurality of pixels within the image in each of the character images TA1 and TA2 into either one of a background pixel having a value within a range of a background color, and a character pixel having a value out of the background color range, thereby generating a character binary data representing the character within the character image included in the scan image SI. FIG. 6B depicts binary images TIA and TIB which are represented by character binary data corresponding respectively to the character images TA1 and TA2 (FIG. 6A) of the scan image SI. For example, a predetermined range, centered on the most frequent values or modes (Rm, Gm, Bm) of the values (RGB values) of the respective components of the plurality of pixels within the scan image SI, is used as the range of the background color.

Figure 6C:
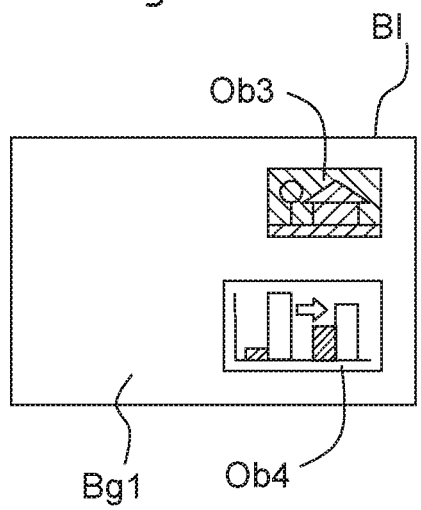

The CPU 210 generates the background image data by using the character binary data and the scan data. Specifically, the CPU 210 replaces each of the values (RGB values) of character pixels, which are included in the plurality of pixels included in the scan image SI indicated by the scan data and which are specified by the character binary data, with a value indicating the background color. As the value indicating the background color, there is used, for example, the above-described modes (Rm, Gm, Bm) of the respective components. As a result, there is generated background image data representing a background image BI in which the character is removed from the scan image SI. FIG. 6C depicts a background image BI corresponding to the scan image Si depicted in FIG. 6A. The background image BI does not include the objects Ob1 and Ob2 corresponding to the removed characters, but includes the objects other than the character, namely, includes the object Ob3 corresponding to the photograph and the object Ob4 corresponding to the drawing.

The CPU 210 compresses the generated background image data. The background image data BI does not include the character, and is a multi-gradation image (for example, 256 gradation image) which may contain a photograph and/or an image. The CPU 210 compresses the background image by using a compression system suitable for compressing such a multi-level gradation image, specifically, by using the JPEG compression.

Further, the CPU 210 compresses the character binary data. For example, the CPU 210 compresses two pieces of character binary data representing the binary images TIA and TIB of FIG. 6B, respectively. Regarding a case of compressing a binary image indicating a character, in a case that the resolution is lowered, any jaggedness in the edge tends to be conspicuous, and the viewability (visibility) tends to be lowered. The CPU 210 uses a compression system suitable for the binary data, specifically uses a reversible compression system capable of compressing the binary data with a high compression rate but without lowering the resolution including, for example, FAXG3, MMR (Modified Modified Read) compression, etc. In such a manner, the background image data and the character binary data are compressed by mutually different methods, respectively.

The CPU 210 uses the compressed background image data, the compressed character binary data, a character color value, and coordinate information to thereby generate a highly compressed PDF file IFh. The character color value is a color value indicating the color of the character within the binary image indicated by each of the character binary data. As the character color value, there is used, for example, average values (Rtx, Gtx, Btx) of the values (RGB values) of the respective components of the plurality of pixels within the scan image SI. The coordinate information is information indicating the positions of the binary image TIA and TIB, which are indicated by the character binary data, within the background image BI. In the PDF, the standard is defined such that image data of a plurality of different kinds of format are stored in one file, and that when this file is reproduced, these image data are superposed and can be reproduced as one image. The CPU 210 generates the highly compressed PDF file IFh in accordance with the standard. As a result, it is possible to store or save the scan image SI including the character in a form in which the character is sharp and easily read, and the size of the data is relatively small. Here, the size of the data of the PDF file means the size of the data amount (for example, unit: bite), rather than the size of the image (number of pixels).

Figure 7A:
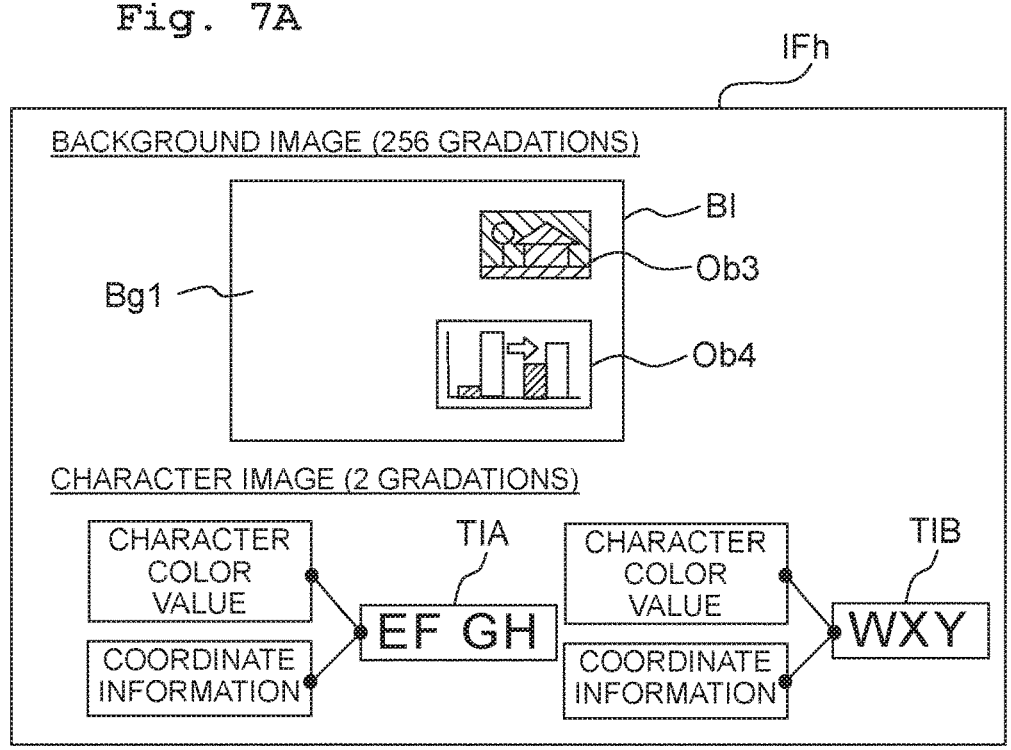
FIGS. 7A and 7B are views each explaining a highly compressed PDF file.

FIG. 7A conceptually depicts the highly compressed PDF file IFh. This highly compressed PDF file IFh is a highly compressed PDF file IFh representing the scan image SI of FIG. 6A. As depicted in FIG. 7A, one piece of the highly compressed PDF file IFh stores a compressed background image data representing the background image BI of FIG.

6C and two pieces of compressed character binary data representing the binary images TIA and TIB, respectively, of FIG. 6B. Character color values indicating the color(s) of the characters within the binary images TIA and TIB, respectively, and two pieces of coordinate information indicating the positions of the binary images TIA and TIB, respectively, within the background image BI are further stored in the highly compressed PDF file IFh, while being associated with the two pieces of the compressed character binary data.

The processing for generating a highly compressed PDF file IFh by using the scan data can be considered as a predetermined compression processing for reducing the size of the data representing the character images TA1 and TA1 each of which indicates the character within the scan image SI, as compared with a case of performing the JPEG compression for the scan data as it is.

Returning to FIG. 2A, in step S12, the CPU 210 transmits the generated highly compressed PDF file IFh to the server 300. The communication between the scanner 200 and the server 300 in relation to the transmission of the highly compressed PDF file IFh, etc., is executed by using, for example, the HTTP (Hypertext Transfer Protocol).

In a case that the server 300 receives the highly compressed PDF file IFh, then the CPU 310 executes, in step S14, the character recognition processing for the highly compressed PDF file IFh. Specifically, the CPU 310 develops the compressed character binary data stored in the highly compressed PDF file IFh to thereby obtain a developed character binary data in the bitmap format. The CPU 310 executes the character recognition processing by using the developed character binary data in the bitmap format, and generates character information regarding the characters within the binary images TIA and TIB.

Figure 7B:
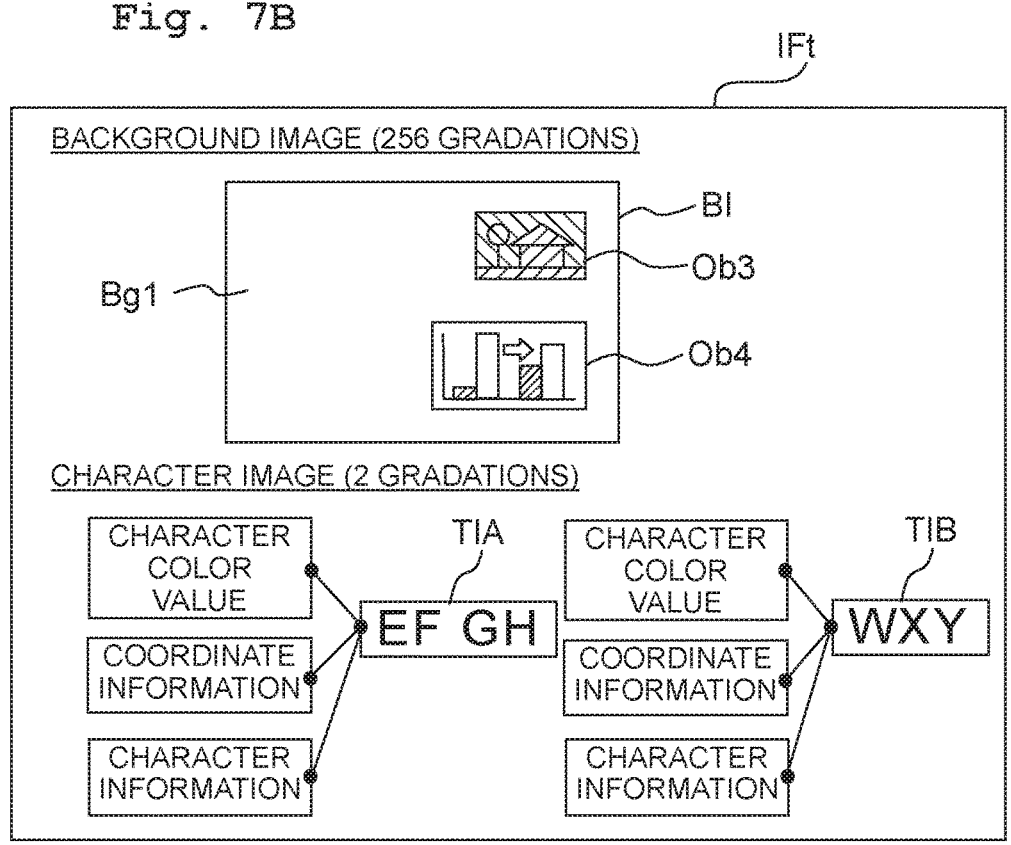

In step S16, the CPU 310 adds the character information to the highly compressed PDF file IFh to thereby generates a character information-added highly compressed PDF file IFt, an example of which being indicated in FIG. 7B. As depicted in FIG. 7B, the character information-added highly compressed PDF file IFt stores two pieces of the character information regarding the characters within the binary images TIA and TIB, respectively, while being associated with the two pieces of the compressed character binary data representing the binary images TIA and TIB, respectively.

In step S18, the CPU 310 transmits the character information-added highly compressed PDF file IFt to the scanner 200. After that, the CPU 310 stands by until the CPU 310 receives a highly compressed PDF file IFh regarding another manuscript, or an end notification (to be described later on) from the scanner 200 (step S22).

In a case that the scanner 200 receives the character information-added highly compressed PDF file IFt, then the CPU 210 determines, in step S28, whether or not reading of all the manuscripts placed on the automatic manuscript conveying section has been completed. In a case that the reading of all the manuscripts has been completed (S28: YES), then the CPU 210 combines, in step S29, a plurality of pieces of the character information-added highly compressed PDF file IFt received from the server 300 in step S18 or in step S44 (to be described later on) until this point of time, to thereby generate one piece of character information-added highly compressed PDF file. In a case that the number of the received character information-added highly compressed PDF file IFt is one (1) piece, then step S29 is omitted. In step S30, the CPU 210 transmits an end notification, indicating the end of the file generation processing, to the server 300. In step S32, the CPU 210 transmits one piece of the character information-added highly compressed PDF file to the terminal apparatus 100, and ends the file generation processing. The one piece of the character information-added highly compressed PDF file received by the terminal apparatus 100 is stored, for example, in the non-volatile storage device 130.

In a case that there is any manuscript for which reading has not been completed (S28: NO), the CPU 210 returns to step S6 to execute the scan processing with respect to the next manuscript.

In a case that size of the scan data is less than the reference value (S8: NO), then the CPU 210 uses, in step S34 of FIG. 3A, the scan data to generate a normal PDF file IFn representing the scan image SI. Specifically, the CPU 210 performs the JPEG compression for the scan data as it is, without separating the scan data into the background image data and the character binary data, thereby generating a normal PDF file IFn including a compressed scan data (not depicted in the drawings). Since the scan image SI (FIG. 6A) includes the character(s), and thus includes more high frequency components as compared with the background image BI (FIG. 6C) which does not include any character. Therefore, the compression rate in a case that the scan data is compressed by the JPEG compression is lower than the compression rate in another case that the background image data is compressed by the JPEG compression. As a result, generally, the size of the data of the highly compressed PDF file IFh as a whole is smaller than the size of the data of the normal PDF file IFn.

In step S36, the CPU 210 transmits the generated normal PDF file IFn to the server 300.

In a case that the server 300 receives the normal PDF file IFn, then the CPU 310 executes, in step S38, the character recognition processing for the normal PDF file IFn. Specifically, the CPU 310 develops the compressed scan data stored in the normal PDF file IFn to thereby obtain a developed scan data in the bitmap format. The CPU 310 executes the character recognition processing by using the developed scan data in the bitmap format, and generates character information regarding the characters within the scan image SI.

Here, an explanation will be given about the difference in the recognition precision of character recognition between the character recognition processing in step S14 of FIG. 2B and the character recognition processing in step S38 of FIG. 3A. As described above, the character recognition processing in step S14 of FIG. 2B is executed by using the character binary data. Due to this, the character pixels composing each of the characters are defined in the character recognition processing in step S14, and thus the kind of the characters are specified based on the character pixels. Accordingly, in a case that it is not possible to specify the kind of a character based on the defined character pixels, the recognition of such character is failed.

On the other hand, the character recognition processing in step S38 is executed by using the scan data. Thus, the character pixels are extracted by binarizing the scan data; and the kind of the characters is specified based on the extracted character pixels. Accordingly, in a case that it is not possible to specify the kind of a character based on the extracted character pixels, then the threshold value of the binarization is adjusted to thereby extract the character pixels again; and the specification of the kind of the characters can be executed again based on the character pixels which have been extracted again. As described above, in the character recognition processing in step S38, it is possible to repeat the trial and error of the extraction of the character pixels and the specification of the kind of characters, thereby realizing a high precision in the character recognition, as compared with the character recognition processing in step S14. In other words, the information amount of the scan data having the values of the 256 gradation pixels is greater than the information amount of the character binary data, and thus the character recognition processing using the scan data can be considered as having the higher precision in the character recognition processing than that of the character recognition processing using the character binary data.

Figure 2B:
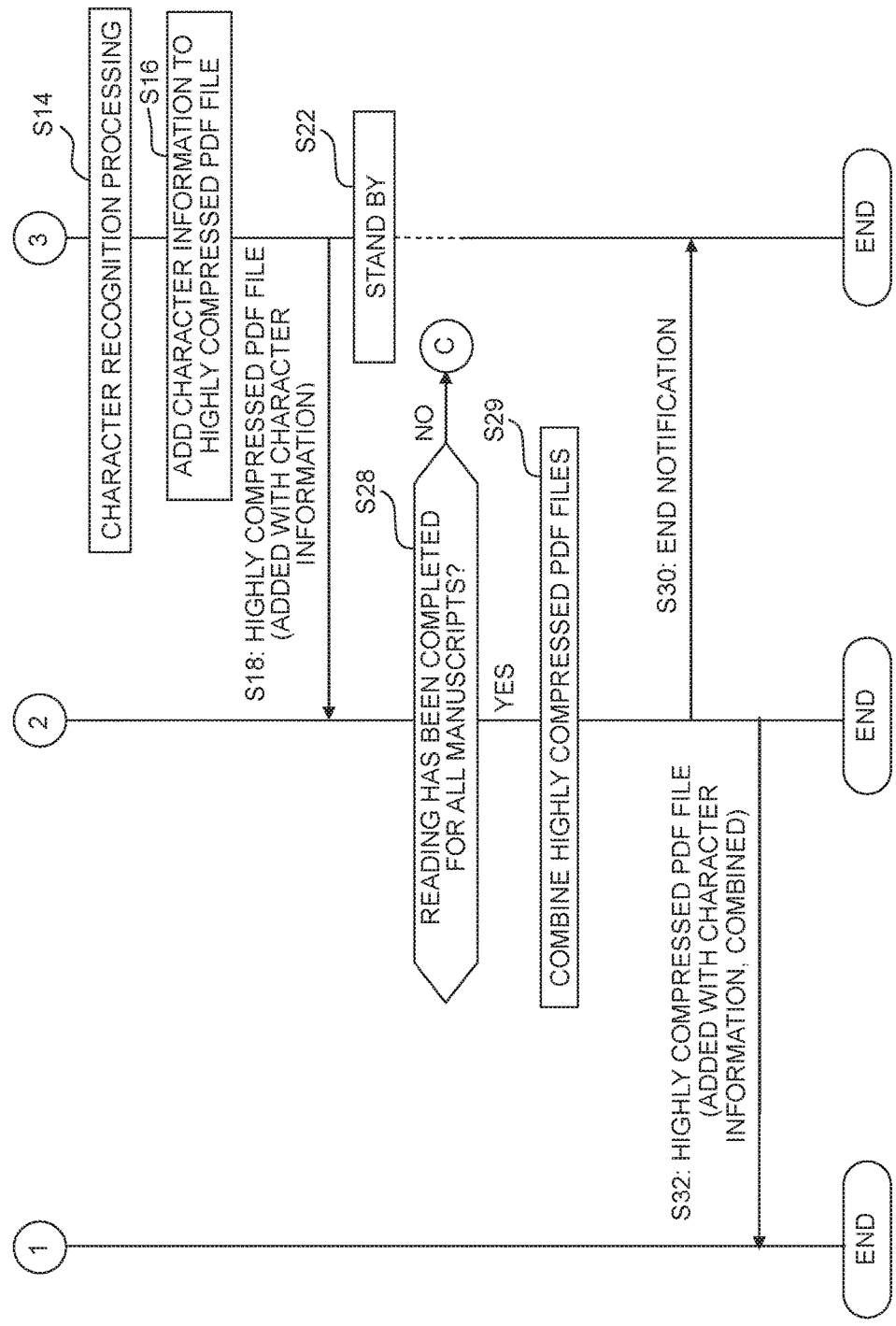

In step S40, the CPU 310 uses the scan data to generate a highly compressed PDF file IFh (FIG. 7A), by executing a processing similar to that of step S10 of FIG. 2A. In step S42, the CPU 310 adds the character information to the highly compressed PDF file IFh by executing a processing similar to that of step S16 of FIG. 2B, thereby generating a character information-added highly compressed PDF file IFt (FIG. 7B).

In step S44, the CPU 310 transmits the character information-added highly compressed PDF file IFt to the scanner 200, in a similar manner as in step S18 of FIG. 2B. Then, the CPU 310 stands by (S46), in a similar manner as in step S22 of FIG. 2B.

In a case that the scanner 200 receives the character information-added highly compressed PDF file IFt, then the CPU 210 determines, in step S52, whether or not reading of all the manuscripts placed on the automatic manuscript conveying section has been completed. In a case that the reading of all the manuscripts has been completed (S52: YES), then the CPU 210 combines, in step S53, a plurality of pieces of the character information-added highly compressed PDF file IFt, in a similar manner as in steps S29 of FIG. 2B. In step S54, the CPU 210 transmits an end notification, indicating the end of the file generation processing, to the server 300. In step S56, the CPU 210 transmits one piece of the character information-added highly compressed PDF file to the terminal apparatus 100, and ends the file generation processing.

In a case that there is any manuscript for which reading has not been completed (S52: NO), the CPU 210 returns to step S6 to execute the scan processing for reading the next manuscript.

In a case that the terminal apparatus 100 has the function of executing the character recognition processing (S4: YES), then in step S57 of FIG. 4, the CPU 210 selects the terminal apparatus 100 as the transmittance destination to which a PDF file, before the character recognition processing is executed therefor, is to be transmitted.

In step S58, the CPU 210 causes the reading executing section 250 to execute a scan processing for one piece sheet of the manuscript, in a similar manner as in step S6 of FIG. 2A. As a result, a scan data is generated and acquired, and is stored in the buffer area 221. In step S60, the CPU 210 determines whether or not the size of the scan data acquired in step S58 is a reference value or more, in a similar manner as in step S8 of FIG. 2A.

In a case that the size of the scan data is the reference value or more (S60: YES), then the CPU 210 uses, in step S62, the scan data to generate a highly compressed PDF file IFh representing the scan image SI (FIG. 7A), in a similar manner as in step S10 of FIG. 2A.

In step S64, the CPU 210 transmits the generated highly compressed PDF file IFh to the terminal apparatus 100.

In a case that the terminal apparatus 100 receives the highly compressed PDF file IFh, then the CPU 110 executes, in step S66, the character recognition processing for the highly compressed PDF file IFh, to thereby generate character information. The specific character recognition processing executed here in step S66 is similar to the character recognition processing executed by the server 300 in step S14 of FIG. 2B.

In step S68, the CPU 110 adds the character information to the highly compressed PDF file IFh to thereby generate a character information-added highly compressed PDF file IFt. In step S69, the CPU 110 combines a character information-added highly compressed PDF file IFt generated in step S68 which has been performed before the most recent step S68, or in step S82 (to be described later on), with the character information-added highly compressed PDF file IFt generated in the most recent step S68, to thereby generate one piece of character information-added highly compressed PDF file; the CPU 110 stores the generated one piece of character information-added highly compressed PDF file, for example, in the non-volatile storage device 130. In a case that the character information-added highly compressed PDF file IFt which has been generated in the most recent step S68 is the initial (initially generated) highly compressed PDF file IFt, the combination is not executed. In step S70, the terminal apparatus 100 stands by until the terminal apparatus 100 receives a highly compressed PDF file IFt or IFh regarding another manuscript, or an end notification (to be described later on) from the scanner 200.

In step S72, the CPU 210 determines whether or not reading of all the manuscripts placed on the automatic manuscript conveying section has been completed. In a case that the reading of all the manuscripts has been completed (S72: YES), then in step S74, the CPU 210 transmits the end notification to the terminal apparatus 100 and thereby ends the file generation processing.

In a case that there is any manuscript for which reading has not been completed (S72: NO), the CPU 210 returns to step S57 to execute the scan processing for the next manuscript.

In step S60, in a case that size of the scan data is less than the reference value (S60: NO), then the CPU 210 uses, in step S75 of FIG. 5, the scan data to generate a normal PDF file IFn representing the scan image SI, in a similar manner as in step S34 of FIG. 3A.

In step S76, the CPU 210 transmits the generated normal PDF file IFn to the terminal apparatus 100.

In a case that the terminal apparatus 100 receives the normal PDF file IFn, then the CPU 110 executes, in step S78, the character recognition processing for the normal PDF file IFn to thereby generate character information. The specific character recognition processing executed in step S78 is similar to the character recognition processing executed by server 300 in step S38 of FIG. 3A.

Figure 3B:
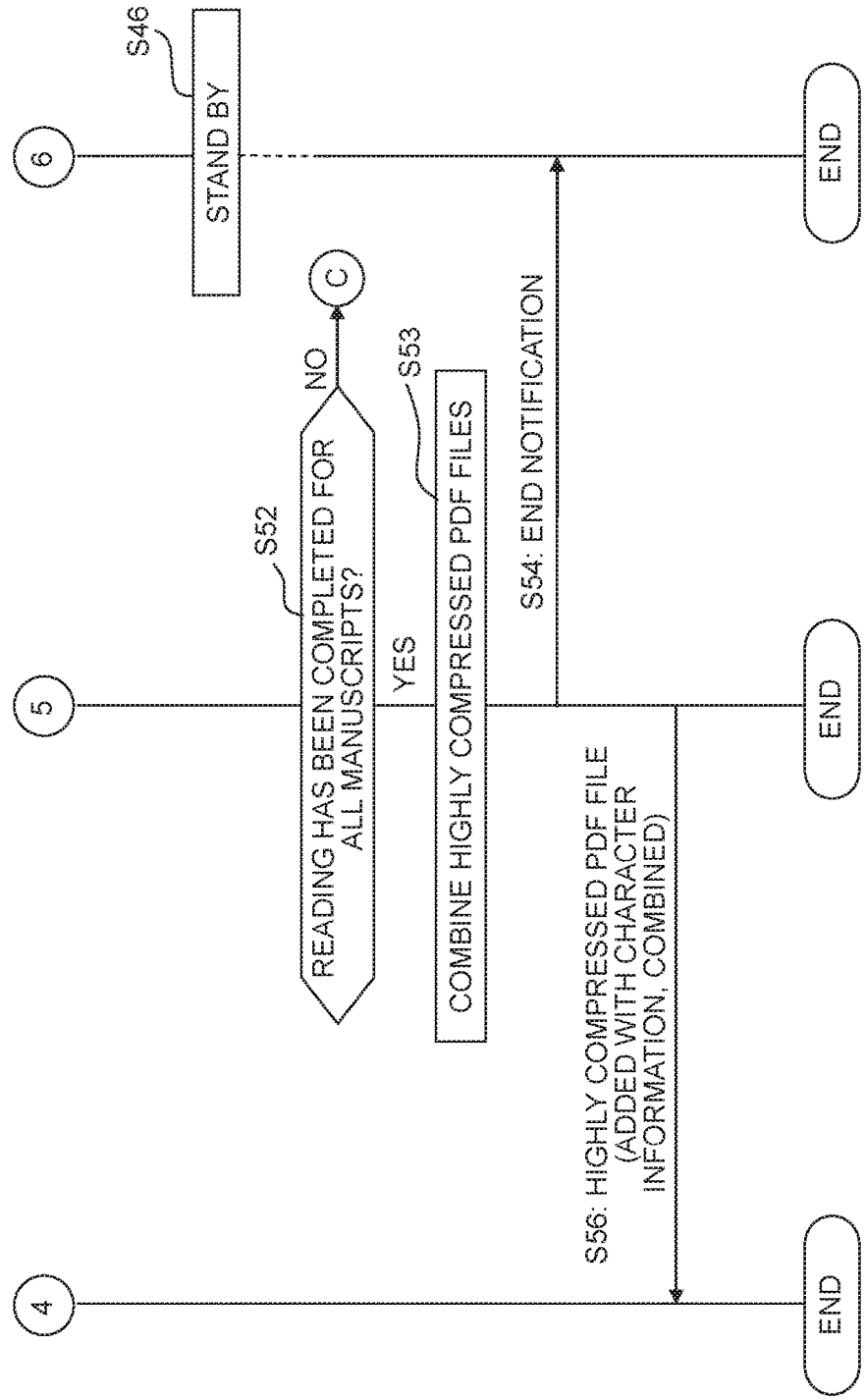
Figure 4:
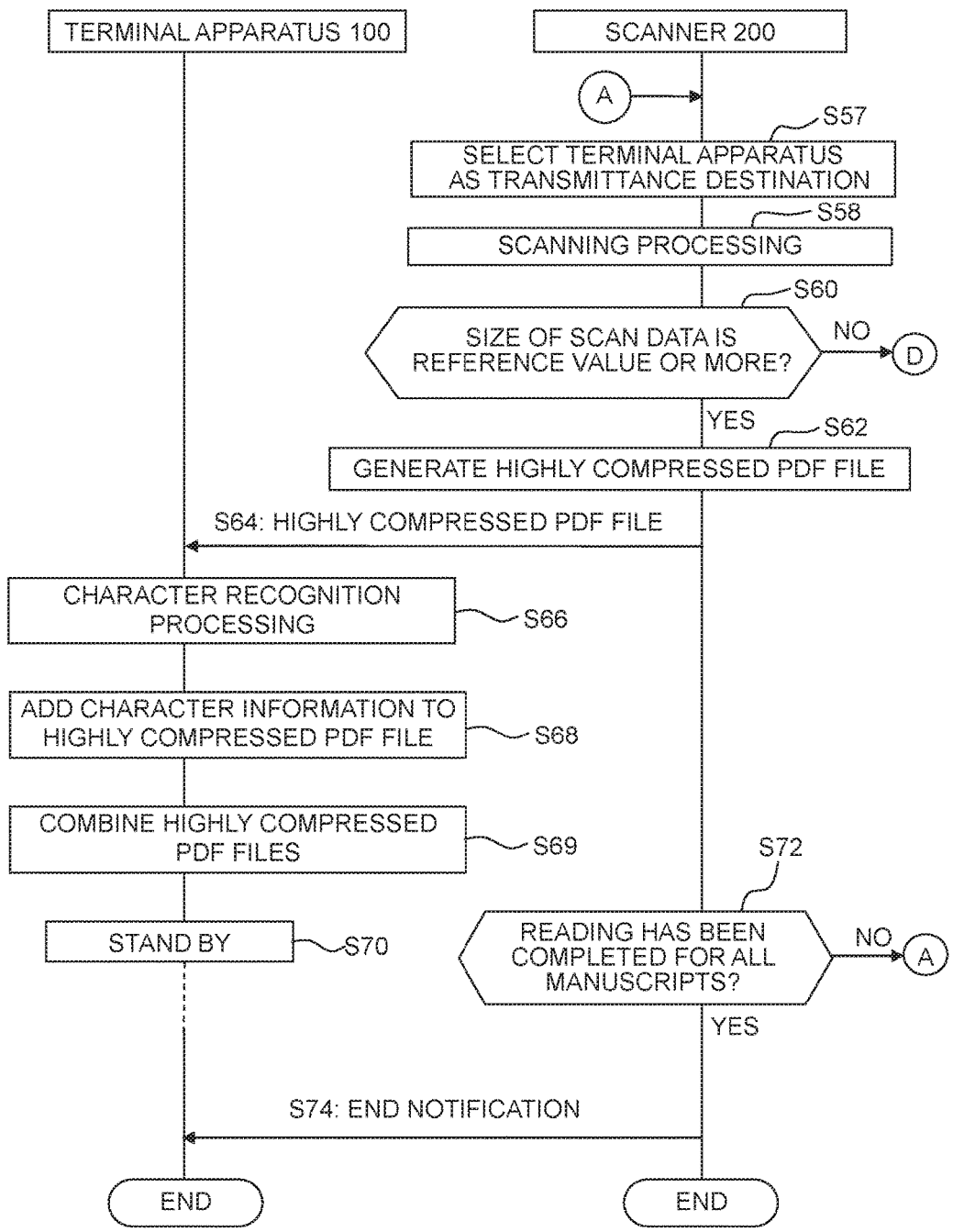
FIG. 4 is a part of the flow chart of the file generation processing of the first embodiment.
Figure 5:
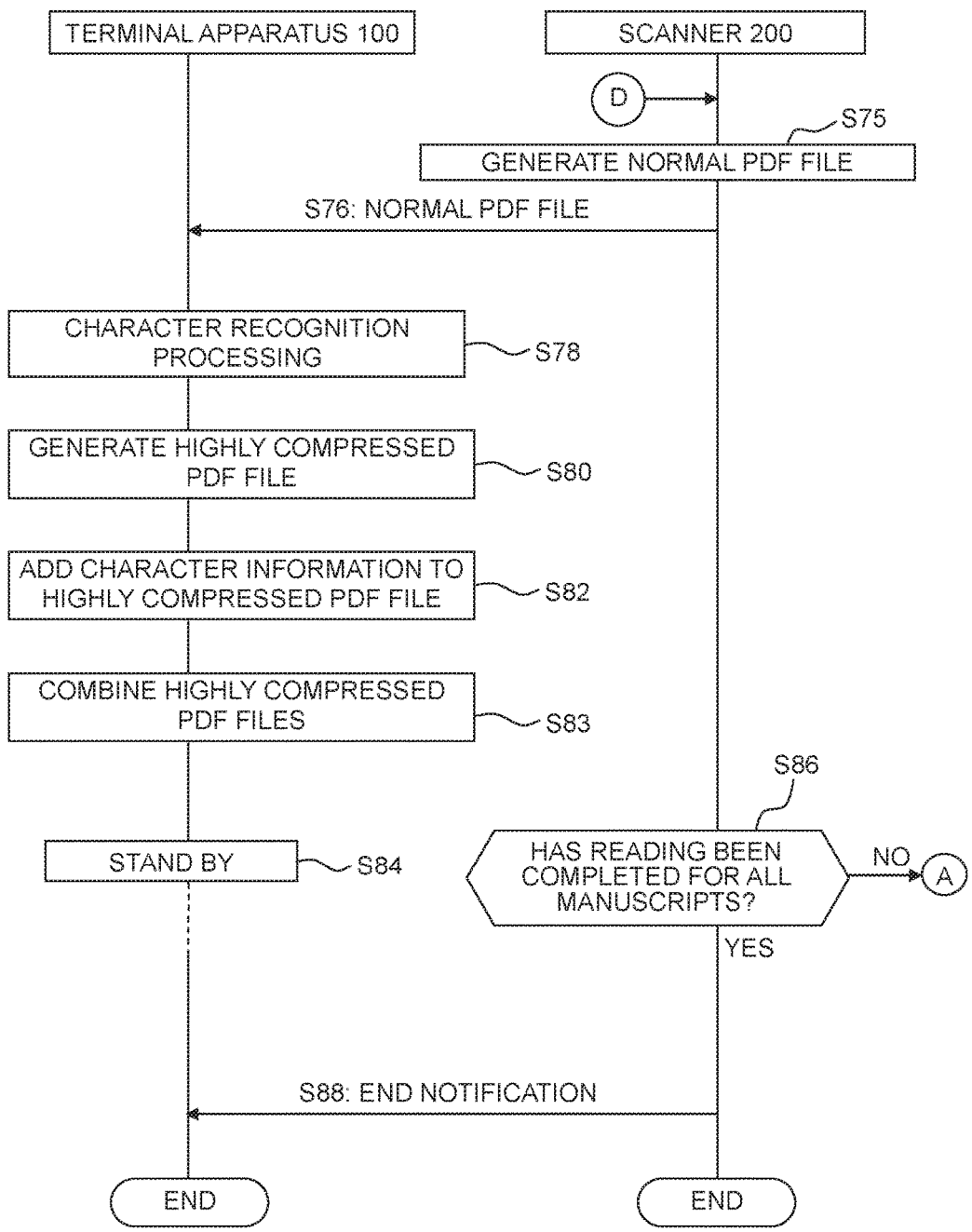
FIG. 5 is a part of the flow chart of the file generation processing of the first embodiment.

In step S80, the CPU 110 uses the scan data to generate a highly compressed PDF file IFh (FIG. 7A), by executing a processing similar to that of step S40 of FIG. 3A. In step S82, the CPU 110 adds the character information to the highly compressed PDF file IFh by executing a processing similar to that of step S42 of FIG. 3A, thereby generating a character information-added highly compressed PDF file IFt (FIG. 7B). In step S83, the CPU 110 performs combination of the generated character information-added highly compressed PDF files IFt, in a similar manner as in step S69 of FIG. 4. In step S84, the CPU 110 stands by, in a similar manner as in step S70 of FIG. 4.

In step S86, the CPU 210 determines whether or not reading of all the manuscripts placed on the automatic manuscript conveying section has been completed. In a case that the reading of all the manuscripts has been completed (S86: YES), then in step S88, the CPU 210 transmits the end notification to the terminal apparatus 100 and thereby ends the file generation processing.

In a case that there is any manuscript for which reading has not been completed (S86: NO), the CPU 210 returns to step S57 to execute the scan processing for the next manuscript.

According to the first embodiment as explained above, the scanner 200 determines whether or not the size of the scan data is the reference value or more (S8). In a case that the size of the scan data is less than the reference value (S8: NO), the scanner 200 transmits the normal PDF file IFn to the server 300 (S36), and receives the character information-added highly compressed PDF file IFt from the server 300 (S44). On the other hand, in a case that the size of the scan data is the reference value or more (S8: YES), the scanner 200 generates the highly compressed PDF file IFh by using the scan data (S10), transmits the highly compressed PDF file IFh to the server 300 (S12), and receives the character information-added highly compressed PDF file IFt from the server 300 (S18).

The time required for transmitting the data to the server 300 becomes longer, as the size of the data to be transmitted is greater. In a case that the PDF file to be transmitted is made to be the highly compressed PDF file to thereby reduce the size of the data to be transmitted, the time required for the data transmission can be made short. On the other hand, in a case that the PDF file to be transmitted is made to be the highly compressed PDF file to thereby reduce the size of the data representing the character image within the scan image SI, there is such a possibility that the precision of the character recognition processing executed by the server 300 (step S14) might be lowered, as compared with a case of transmitting the normal PDF file IFn to the server 300. According to the above-described first embodiment, any one of the normal PDF file IFn and the highly compressed PDF file IFh of which size is smaller than that of the normal PDF file IFn is transmitted to the server 300, depending on the size of the scan data. As a result, when the PDF file is transmitted to the server 300 so as to allow the server 300 to execute the character recognition processing, it is possible to appropriately adjust the balance between the time required for the transmission of the PDF file and the precision of the character recognition processing. Thus, it is possible to suppress any excessive increase in the time required for causing the server 300 to execute the character recognition processing and to suppress any excessive decrease in the precision of the character recognition processing. As a result, it is possible to suppress any excessive increase in the time required for generating the character information-added highly compressed PDF file IFt, and to suppress any excessive decrease in the precision of the character information included in the character information-added highly compressed PDF file IFt.

In the above-described first embodiment, further, the scanner 200 acquires the function information from the terminal apparatus 100 (S2); in a case that the terminal apparatus 100 has the character recognition processing function (S4: YES), the scanner 200 transmits one of the normal PDF file IFn and the highly compressed PDF file IFh to the terminal apparatus 100 (S64, S76). On the other hand, in a case that the terminal apparatus 100 does not have the character recognition processing function (S4: NO), the scanner 200 transmits one of the normal PDF file IFn and the highly compressed PDF file IFh to the server 300 (S12, S36). As a result, it is possible to appropriately select the apparatus to be allowed to execute the character recognition processing, depending on whether or not the terminal apparatus 100 has the character recognition processing function. Specifically, in a case that the terminal apparatus 100 has the character recognition processing function, it is considered that the character recognition processing is more preferably executed by the terminal apparatus 100. The reasoning for this is as follows: since the transmission between the scanner 200 and the server 300 can be omitted, the time required for generating the character information-added highly compressed PDF file IFt can be shortened.

Furthermore, in the above-described first embodiment, in a case that the normal PDF file IFn is transmitted to the server 300 (S36), the scanner 200 receives, from the server 300, not only the character information generated by the character recognition processing but also the character information-added highly compressed PDF file IFh which includes the character information and the highly compressed PDF file (S44). As a result, there is no need to execute the processing for generating the highly compressed PDF file in the scanner 200, and thus the processing load on the scanner 200 can be reduced.

Moreover, in the above-described first embodiment, also in a case of transmitting the PDF file to the terminal apparatus 100, the scanner 200 determines whether or not the size of the scan data is the reference value or more (S60). In a case that the size of the scan data is less than the reference value (S60: NO), the scanner 200 transmits the normal PDF file IFn to the terminal apparatus 100 (S76); on the other hand, in a case that the size of the scan data is the reference value or more (S60: YES), the scanner 200 generates the highly compressed PDF file IFh by using the scan data (S62), and transmits the highly compressed PDF file IFh to the terminal apparatus 100 (S64). As a result, also in a case of allowing the terminal apparatus 100 to execute the character recognition processing, it is possible to suppress any excessive increase in the time required for causing the terminal apparatus 100 to execute the character recognition processing and to suppress any excessive decrease in the precision of the character recognition processing.

Further, in the first embodiment, in a case of generating the character information-added highly compressed PDF files IFt regarding a plurality of manuscripts, the determination, as to whether the size of the scan data is the reference value or more, is made for each of the scan data representing one of the manuscripts; and the decision, as which one of the normal PDF file IFn and the highly compressed PDF file IFh is to be transmitted to the apparatus (the terminal apparatus 100 or the server 300) which is to be allowed to execute the character recognition processing, is made with respect to each of the scan data. As a result, it is possible to appropriately adjust the balance between the time required for the transmission of the PDF file and the precision of the character recognition processing, for each of the scan data representing one of the manuscripts. Accordingly, in a case of generating the character information-added highly compressed PDF file IFt for each of the plurality of manuscripts, it is possible to suppress, further appropriately, any excessive increase in the time required for executing the character recognition processing and to suppress any excessive decrease in the precision of the character recognition processing.

As appreciated from the foregoing explanation, in the first embodiment, the scanner 200 is an example of the image processing apparatus. The size of the scan data being less than the reference value is an example of the first condition, and the size of the scan data being the reference value or more is an example of the second embodiment. The normal PDF file IFn is an example of the first image data, and the highly compressed PDF file IFh is an example of the second image data. Further, the character information generated by the character recognition processing in step S14 is an example of the second character information, and the character information-added highly compressed PDF file IFt received by the scanner 200 in step S18 is an example of the second processed data. The character information generated by the character recognition processing in step S38 is an example of the first character information, and the character information-added highly compressed PDF file IFt received by the scanner 200 in step S44 is an example of the first processed data. Furthermore, the processing for generating the highly compressed PDF file IFh by using the scan data is an example of the predetermined compression processing.

Second Embodiment

In a second embodiment of the present teaching, a terminal apparatus 100 having the function of the character recognition processing acquires the scan data from the scanner 200, and generates a character information-added highly compressed PDF file IFt by using the scan data. In the second embodiment, the server 300 is not used. In the second embodiment, the terminal apparatus 100 is an example of the image processing apparatus.

Figure 8:
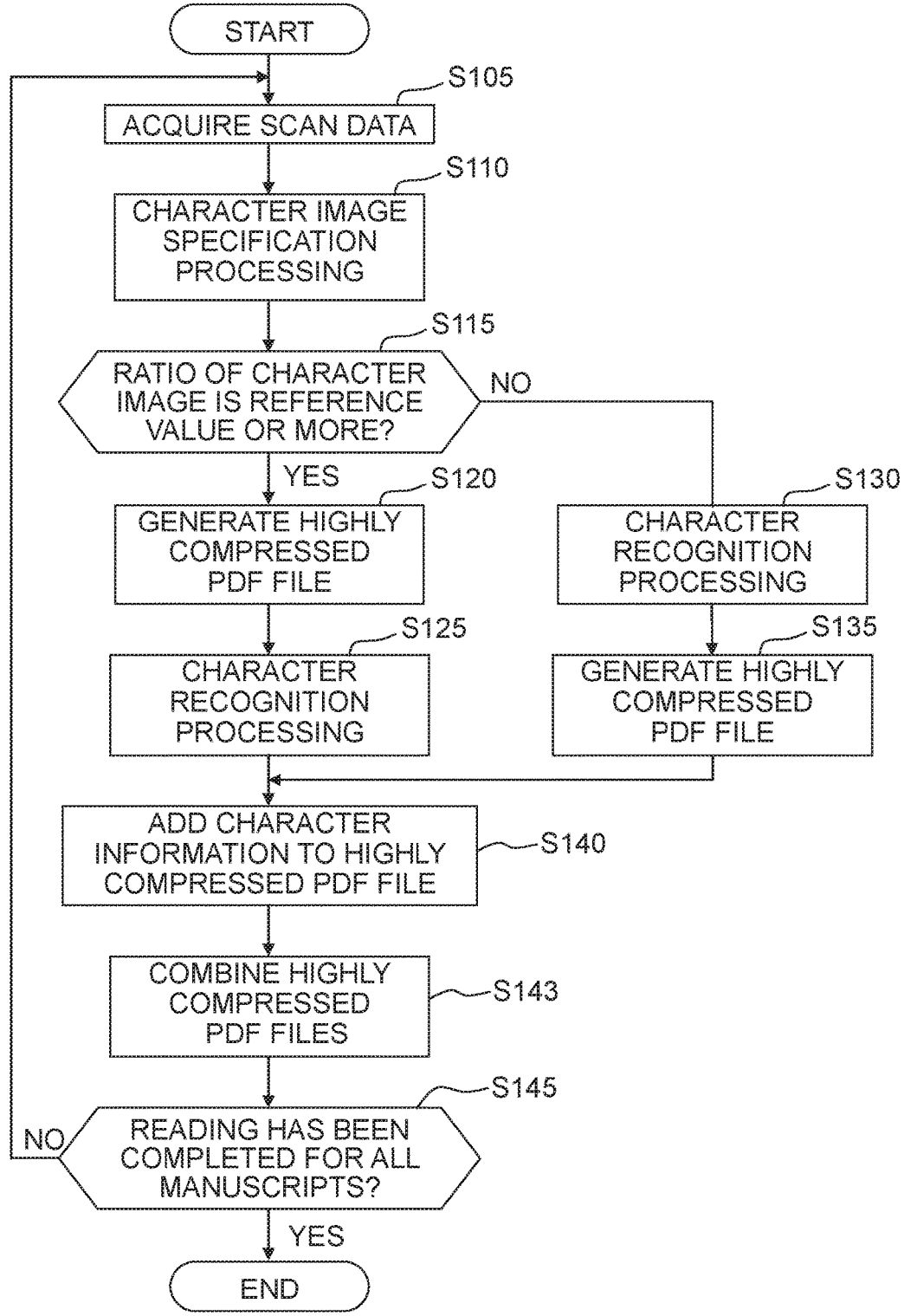
FIG. 8 is a flow chart of a file generation processing of a second embodiment.

The file generation processing in the second embodiment, as depicted in FIG. 8, is realized by the execution of the driver program PG1 by the CPU 110 of the terminal apparatus 100. The file generation processing is started in a case that a starting instruction to start reading of a manuscript is inputted to the terminal apparatus 100, in a similar manner as in the first embodiment.

In step S105, the CPU 110 controls the scanner 200 to read one piece (sheet) of the manuscript, thereby acquiring a scan data representing a scan image SI from the scanner 200.

In step S110, the CPU 110 executes a character image specification processing for specifying one or more character image(s) including a character within the scan image SI. As a result, for example, character images TA1 and TA2 indicating the characters, respectively, are specified within the scan image 51 of FIG. 6A.

In step S115, the CPU 110 determines whether or not a ratio Tr occupied by the character images TA1 of TA2 in the scan image SI is a reference value or more. For example, the CPU 110 calculates the ratio occupied by a total value of the area(s) of one or more character image(s), which has (have) been specified, with respect to the area of the scan image SI, and determines whether or not this ratio is a reference value (for example, 40%) or more.

In a case that the ratio Tr is the reference value or more (S115: YES), then the CPU 110 generates, in step S120, a highly compressed PDF file IFh (FIG. 7A) by using the scan data, by executing a processing similar to that in step S10 of FIG. 2A. In step S125, the CPU 110 executes the character recognition processing for the highly compressed PDF file IFh, thereby generating character information. The character recognition processing in step S125 is a processing similar to the character recognition processing in step S14 of FIG. 2B. In such a manner, in a case that the ratio Tr is the reference value or more, the generation processing for generating the highly compressed PDF file IFh is executed previously (firstly), and the character recognition processing is executed thereafter.

On the other hand, in a case that the ratio Tr is less than the reference value (S115: NO), then the CPU 110 executes, in step S130, the character recognition processing for the scan data in the bitmap format, and thereby generates character information, in a similar manner as in step S38 of FIG. 3A. In step S135, the CPU 110 executes a processing similar to that in step S10 of FIG. 2A, and thereby generates a highly compressed PDF file IFh by using the scan data. In such a manner, in a case that the ratio Tr is less than the reference value, the character recognition processing is executed previously (firstly), and the generation processing for generating the highly compressed PDF file IFh is executed thereafter.

In step S140, the CPU 110 adds the character information to the highly compressed PDF file IFh, and thus generates a character information-added highly compressed PDF file IFt (FIG. 7B). In step S143, the CPU 110 performs combination of the generated character information-added highly compressed PDF files IFt, in a similar manner as in step S69 of FIG. 4.

In step S145, the CPU 110 determines whether or not reading of all the manuscripts placed on the automatic manuscript conveying section has been completed. In a case that there is any manuscript for which reading has not been completed (S145: NO), the CPU 110 returns to step S105 so as to allow the scanner 200 to read the next manuscript, and acquires the scan data from the scanner 200. On the other hand, in a case that the reading of all the manuscripts has been completed (S145: YES), the CPU 110 ends the file generation processing.

According to the second embodiment as explained above, in a case that the ratio Tr occupied by the character image in the scan image is less than the reference value (S115: NO), the CPU 110 executes the character recognition processing for the scan data and thereby generates the character information (S130), and then after executing the character recognition processing, the CPU 110 generates the highly compressed PDF file IFh by using the scan data (S135). On the other hand, in a case that the ratio Tr occupied by the character image in the scan image is the reference value or more (S115: YES), the CPU 110 generates the highly compressed PDF file IFh by using the scan data (S120), and then the CPU 110 executes the character recognition processing for the highly compressed PDF file IFh and thereby generates the character information (S125).

In a case that the size of the data representing the character image within the scan data is reduced by generating the highly compressed PDF file IFh, the resource required for the character recognition processing such as, for example, the required capacity of the buffer area 121, the load on the CPU 110, etc., may be reduced. On the other hand, in the case that the size of the data representing the character image within the scan data is reduced by generating the highly compressed PDF file IFh, there is such a possibility that the precision of the character recognition processing might be lowered. According to the second embodiment, either the character recognition processing for the scan data or the character recognition processing for the highly compressed PDF file IFh is executed, depending on the ratio Tr occupied by the character image in the scan image. As a result, it is possible to appropriately adjust the balance between the resource required for the character recognition processing and the precision of the character recognition processing. Thus, it is possible to suppress any excessive increase in the resource required for the character recognition processing and to suppress any excessive decrease in the precision of the character recognition processing.

In a case that the ratio Tr occupied by the character image in the scan image is less than the reference value, the amount of the data as the object of the character recognition processing is relatively small, and thus there is a low possibility that the resource required for the character recognition processing becomes excessively great. In contrast, in a case that the ratio Tr occupied by the character image in the scan image is the reference value or more, the amount of the data as the object of the character recognition processing is relatively great, and thus there is a possibility that the resource required for the character recognition processing becomes excessively great. Considering these points, in the second embodiment, the condition for the character recognition processing to be executed for the scan data is that the ratio Tr occupied by the character image in the scan image is less than the reference value; whereas the condition for the character recognition processing to be executed for the highly compressive PDF file IFh is that the ratio Tr occupied by the character image in the scan image is the reference value or more. As a result, it is possible to appropriately suppress, depending on the size of the scan data, any excessive increase in the resource required for the character recognition processing and/or in the processing time, and possible to suppress any excessive decrease in the precision of the character recognition processing.

[Modification 1]

Figure 9A:
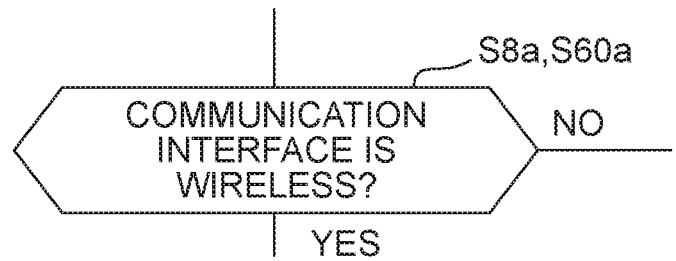
FIGS. 9A to 9E are views each explaining a part of a file generation processing of one of modifications 1 to 5.

For example, in a case that the scanner 200 is provided with a wireless interface for wireless communication (for example, an interface for the Wi-Fi communication) and a wired interface for wired communication (for example, an interface for the Ethernet (Trade name), the USB interface, etc.), it is allowable to execute steps S8a, S60a depicted in FIG. 9A, instead of executing the steps S8, S60 of the above-described first embodiment.

In step S8a, the CPU 210 determines whether or not the communication interface used for the communication between the scanner 200 and the server 300 is the wireless interface or the wired interface. In step S60a, the CPU 210 determines whether or not the communication interface used for the communication between the scanner 200 and the terminal apparatus 100 is the wireless interface or the wired interface.

Namely, in this Modification 1, in a case of transmitting a PDF file for the character recognition processing to the server 300 or the terminal apparatus 100, the condition for the normal PDF file IFn to be transmitted is that the communication interface is the wired interface; whereas the condition for the highly compressed PDF file IFh to be transmitted is that the communication interface is the wireless interface. This is because, generally, there is such a possibility that the communication speed of the wireless interface becomes excessively slow, as compared with the wired communication. In particular, in a case that the terminal apparatus 100, such as a smartphone, connected with the wireless communication is the transmission destination, there is such a possibility that the terminal apparatus 100 might be located at a position or location in which the radio wave is hard to reach and at which the communication state is not satisfactory, and thus there is such a possibility that the communication speed might become excessively slow. According to the modification 1, it is possible to appropriately adjust the balance between the time required for transmitting the PDF file and the precision of the character recognition processing, depending on whether the communication interface used for the communication with the server 300 and the terminal apparatus 100 is wired or wireless.

Note that although in steps S8a and S60, the determination regarding the communication interface is not limited only to being whether the communication interface is the wireless communication interface or the wired interface; it is allowable to determine, for example, whether the communication interface is a USB interface or an Ethernet (trade name) interface. In a case that the communication interface is the Ethernet (trade name) interface, there is such a possibility that the communication speed in the Ethernet (trade name) interface might become excessively slow as compared with the USB interface. For example, in a case that the communication interface is the Ethernet (trade name) interface, and under a condition that the traffic of the LAN to which the communication interface is connected is great, there is such a possibility that the communication speed might be excessively slow.

[Modification 2]

Figure 9B:
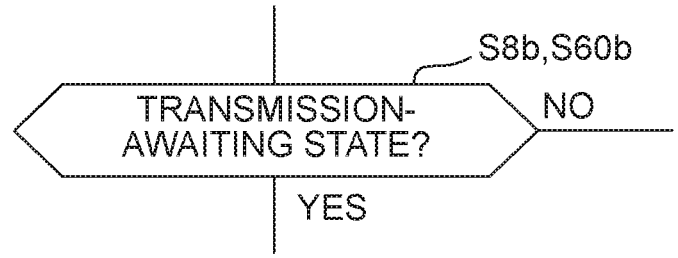

It is allowable to execute steps S8b, S60b depicted in FIG. 9B, instead of executing the steps S8, S60 of the above-described first embodiment. In steps S8b and S60b, the CPU 210 determines whether or not the communication state of the communication between the scanner 200 and the server 300 or the terminal apparatus 100 is a transmission-awaiting state or an immediate transmission-enabled (capable) state. For example, in a case that there is any transmission-awaiting data (for example, another PDF file) in the transmission buffer, the CPU 210 determines that the communication state is the transmission-awaiting state (S8b, S60b: YES); on the other hand, in a case that there is not any transmission-awaiting data in the transmission buffer, the CPU 210 determines that the communication state is the immediate transmission-enabled state (S8b, S60b: NO). Alternatively, in a case that the CPU 210 transmits a transmission request to the apparatus as the transmission destination (the server 300 or the terminal apparatus 100) and receives a response indicating that the transmission is disabled (impossible), or in a case that the CPU 210 cannot receive any response from the apparatus as the transmission destination within a predetermined time, the CPU 210 determines that the communication state is the transmission-awaiting state (S8b, S60b: YES). On the other hand, in a case that the CPU 210 receives, with respect to the transmission request, a response indicating that the transmission is enabled (possible) from the apparatus as the transmission destination within the predetermined time, the CPU 210 determines that the communication state is the immediate transmission-enabled state (S8b, S60b: NO).

Namely, in the modification 2, in a case of transmitting a PDF file for the character recognition processing to the server 300 or to the terminal apparatus 100, the condition for the normal PDF file IFn to be transmitted is that the communication state of the communication between the scanner 200 and the server 300 or the terminal apparatus 100 is the immediate transmission-enabled state; and the condition for the highly compressed PDF file IFh to be transmitted is that the communication state of the communication between the scanner 200 and the server 300 or the terminal apparatus 100 is the transmission-awaiting state.

Note that, more generally, in a case of transmitting a PDF file for the character recognition processing to the server 300 or to the terminal apparatus 100, the condition for the normal PDF file IFn to be transmitted is that the communication state of the communication between the scanner 200 and the server 300 or the terminal apparatus 100 is a first communication state; and the condition for the highly compressed PDF file IFh to be transmitted is that the communication state of the communication between the scanner 200 and the server 300 or the terminal apparatus 100 is a second communication state which is more restricted than the first communication state. The first communication state includes, for example, the immediate transmission-enabled state as described above, a state that the transmission can be performed at a communication speed which is a reference value or more, etc. The second communication state includes, for example, the transmission-awaiting state as described above, a state that the transmission can be performed only at a communication speed which is less than the reference value, etc. According to the modification 2, it is possible to appropriately adjust the balance between the time required for transmitting the PDF file and the precision of the character recognition processing, depending on the communication state of communication between the scanner 200 and the server 300 or the terminal apparatus 100.

As appreciated from the first embodiment and the modifications 1 and 2, in a cases of transmitting a PDF file for the character recognition processing to the server 300 or to the terminal apparatus 100, the condition for determining whether the normal PDF file IFn is to be transmitted or whether the highly compressed PDF file IFh is to be transmitted preferably includes, in general, a condition relating to the time required for transmitting data to the server 300 or the communication apparatus 100.

[Modification 3]

Figure 9C:
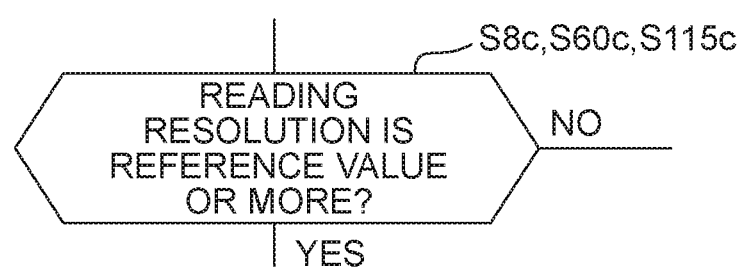

It is allowable to execute steps S8c and S60c, and step S115c depicted in FIG. 9C, instead of executing the steps S8, S60 of the above-described first embodiment and the step S115 of the above-described second embodiment, respectively. In steps S8c, S60c and S115c, the CPU 110 or the CPU 210 determines whether or not the reading resolution of the scan data is a reference value (for example, 1200 dpi) or more. In a case that the reading resolution of the scan data is the reference value or more (S8c, S60c, S115c: YES), it is considered that the precision of the character recognition processing is hardly lowered even if the character recognition processing is executed for the highly compressed PDF file IFh. Accordingly, in this case, in the first embodiment, it is considered that the highly compressed PDF file IFh is preferably transmitted to the server 300 and the terminal apparatus 100. Further, in this case, in the second embodiment, it is considered that the character recognition processing is preferably executed for the highly compressed PDF file IFh.

[Modification 4]

Figure 9D:
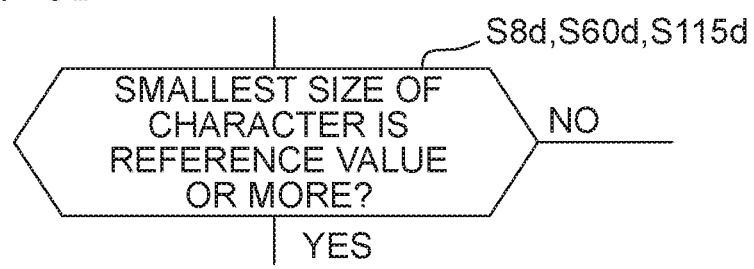

It is allowable to execute steps S8d and S60d, or step S115d depicted in FIG. 9D, instead of executing the steps S8, S60 of the above-described first embodiment or the step S115 of the above-described second embodiment, respectively. In steps S8d, S60d and S115d, the CPU 110 or the CPU 210 determines whether or not a minimum (smallest) size of the character in the scan image SI is a reference value or more. The smallest size of the character in the scan image SI is determined, for example, by analyzing the scan data so as to specify the character image within the scan image SI, by specifying one or more character string(s) in the lateral direction within the specified character image, and by specifying the height of the specified character string. In a case that the smallest size of the character in the scan image SI is less than the reference value (S8d, S60d, S115d: NO), it is considered that the precision of the character recognition processing is likely to be lowered. For this reasoning, in the first embodiment, it is considered that the normal PDF file IFn is preferably transmitted to the server 300 and the terminal apparatus 100. Further, in this case, in the second embodiment, it is considered that the character recognition processing is preferably executed for the scan data.

[Modification 5]

Figure 9E:
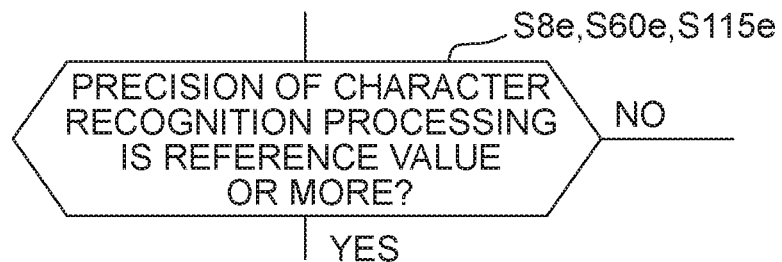

It is allowable to execute steps S8e and S60e, or step S115e depicted in FIG. 9E, instead of executing the steps S8, S60 of the above-described first embodiment or the step S115 of the above-described second embodiment, respectively. In steps S8e, S60e and S115e, the CPU 110 or the CPU 210 determines whether or not the precision of the character recognition processing executed for a scan data which has been already processed is a reference value or more. The character recognition processing function includes, for example, a function of outputting the success rate of specifying the kind of the character, and/or a function of outputting an index value indicating the extent of correctness in the result of the specification of the kind of the character, etc., in some cases. In such a case, the CPU 110 or the CPU 210 determines whether or not the precision of the character recognition processing executed for the scan data which has been already processed is the reference value or more, based on the success rate and/or the index value. In a case that the CPU 210 of the scanner 200 performs the determination, it is allowable that the CPU 210 acquires the success rate and/or the index value from the terminal apparatus 100 or the server 300 which has executed the character recognition processing. In a case that the precision of the character recognition processing executed for the scan data which has been already processed is less than the reference value, it is considered that the precision of the character recognition processing to be executed for a scan data which has not been processed yet is also likely to be lowered. In particular, in a case that the character recognition processing has been executed for a highly compressed PDF file IFh and the precision of the character recognition processing is less than the reference value (S8e, S60e, S115e: NO), it is preferred that the character recognition processing to be executed for a scan data which has not been processed yet is executed for a scan data (normal PDF file IFn) so as to suppress any excessive lowering of the precision of the character recognition processing. For this reason, in the first embodiment, it is considered that the normal PDF file IFn is preferably transmitted to the server 300 or the terminal apparatus 100, regarding the above-described situation. Further, in this case, in the second embodiment, it is considered that the character recognition processing is preferably executed for the scan data, regarding the above-described situation.

As appreciated from the modification 4 and the modification 5, in a case of transmitting a PDF file for the character recognition processing to the server 300 or to the terminal apparatus 100 in the first embodiment, the condition for determining whether the normal PDF file IFn is to be transmitted or whether the highly compressed PDF file IFh is to be transmitted preferably includes, in general, a condition relating to the scan data, for example, a condition relating to the precision of the character recognition processing for the scan data. Further, in the second embodiment, the condition for determining whether the character recognition processing is to be executed for the scan data, or whether the character recognition processing is to be executed for the highly compressed PDF file IFh preferably includes, in general, a condition relating to the scan data, for example, a condition relating to the precision of the character recognition processing for the scan data.

[Modification 6]

It is allowable that the CPU 110 determines whether or not the size of the scan data is the reference value or more, similarly to the step S8 of the first embodiment, instead of executing the step S115 of the above-described second embodiment. In a case that the size of the scan data is the reference value or more, there is such a possibility that the resource required for the character recognition processing for the scan data might become excessively large. Accordingly, in this case, in the second embodiment, it is considered that the character recognition processing is preferably executed for the highly compressed PDF file IFh.

[Modification 7]

In a case of transmitting the PDF file to the server 300 or the terminal apparatus 100 as explained in relation to the first embodiment and the modifications, all or a part of the plurality of kinds of conditions, for determining whether the normal PDF file IFn is to be transmitted or whether the highly compressed PDF file is to be transmitted, may be combined as a necessary condition or a sufficient condition. For example, the condition for the normal PDF file IFn to be transmitted may be such a condition that the state of the communication between the scanner 200 and the server 300 or the terminal apparatus 100 is the immediately transmission-enabled state, and that the size of the scan data is less than the reference value, and that the communication interface is the wired interface. Alternatively, the condition for the normal PDF file IFn to be transmitted may be such a condition that the state of the communication between the scanner 200 and the server 300 or the terminal apparatus 100 is the immediately transmission-enabled state, or the size of the scan data is less than the reference value, or that the communication interface is the wired interface.

[Modification 8]

The normal PDF file IFn transmitted from the scanner 200 in steps S36 and S76 of the above-described first embodiment is a JPEG-compressed scan data. It is allowable, however, to transmit a scan data before being subjected to the JPEG compression. Alternatively, the normal PDF file IFn may be a scan data which is compressed by another compression system, different from the JPEG compression, such as the FLATE compression.

[Modification 9]

In steps S18 and S44 of the first embodiment, the data which the scanner 200 receives from the server 300 is a character information-added highly compressed PDF file IFt. It is allowable, however, that the data which the scanner 200 receives from the server 300 is only the character information. In such a case, it is allowable that the CPU 210 of the scanner 200 adds the received character information to a highly compressed PDF file IFh which the server 200 itself has generated, to thereby generate a character information-added highly compressed PDF file IFt.

[Modification 10]

In the first embodiment, with respect to all the manuscripts, the CPU 210 of the scanner 200 receives a character information-added highly compressed PDF file IFt in step S18 or step S44 and then the CPU 210 combines a plurality of pieces of the received character information-added PDF file IFt in step S29 or S53. Instead of doing so, it is allowable that every time the CPU 210 receives a character information-added highly compressed PDF file in step S18 or in step S44, the CPU 210 combines the received character information-added highly compressed PDF file IFt with another character-added highly compressed PDF file IFt which the CPU 210 has already received.

Further, in the first embodiment, every time the CPU 310 of the server 300 generates a character information added-highly compressed PDF file IFt in step S16 or S42, the CPU 310 transmits the generated character information added-highly compressed PDF file IFt to the scanner 200 in step S18 or S44. Instead of doing so, it is allowable that after the CPU 310 has generated all the character information-added highly compressed PDF files IFt, the CPU 310 combines all these character information-added highly compressed PDF files IFt, and transmits this one combined character information-added highly compressed PDF file to the scanner 200.

[Modification 11]

It is allowable that the file generation processing of the second embodiment is executed by the CPU 310 of the server 300, rather than being executed by the CPU 110 of the terminal apparatus 100. For example, the scanner 200 transmits a generation request for generating a character information-added highly compressed PDF file IFt and the scan data to the server 300. It is allowable that the CPU 310 of the server 300 uses the scan data received from the scanner 200 so as to execute the file generation processing of the second embodiment, in accordance with the generation request received from the scanner 200. The character information-added highly compression PDF file IFt generated in the server 300 is transmitted, for example, to the scanner 200 or to the terminal apparatus 100.

[Modification 12]

It each of the embodiments as described above, the predetermined compression processing executed for the scan data is a processing for generating a highly compressed PDF file IFh by using the scan data. Instead of this, it is allowable that the predetermined compression processing may be another compression processing for reducing the size of the data of the character image within the scan image SI, rather than being the above-described processing. For example, the predetermined compression processing may be such a processing wherein the scan image SI is divided into a character image and an image of a region different from the character image, the character image is converted to the grey scale an then is compressed, and the image of the region different from the character image is compressed as it is.

[Modification 13]

In each of the embodiments as described above, the image file which is generated in the file generation processing is a PDF file. Instead of this, it is allowable to generate, for example, an image file described by another page description language such as XPS system (XML Paper Specification), etc.

[Modification 14]

The file generation processing in each of the embodiments described above is an example, and may be modified as appropriate. For example, the processing in step S4 of FIG. 2A and the processing in step S57 and the processings thereafter of FIG. 4 may be omitted; it is allowable that the character recognition processing is not executed in the terminal apparatus 100, and that the character recognition processing may be executed always by the server 300.

[Modification 15]

The server 300 may be a so-called cloud server composed of a plurality of calculators (computers) which are communicably connected to each other, rather than one (single) calculator. Further, the scanner 200 is not limited to a single scanner, and may be a multi-function peripheral provided with the scanner function, or may be a digital camera capable of optically reading a manuscript by photographing.

[Modification 16]

It is allowable to replace, with a software, a portion or part of the configuration realized by the hardware in each of the above-described embodiments. Conversely, it is also allowable to replace, with a hardware, a portion or part of the configuration realized by the software.

Although the present teaching has been explained as above regarding the embodiments, examples and modifications, the embodiments, examples and modifications are provided so that the present teaching can be understood easily, but not provided so as to limit the present teaching in any way. The present teaching can be changed, modified and improved, without departing from the spirit and/or gist of the present teaching and the range of the claims, and the present teaching includes any equivalents thereof.

What is claimed is:

1. An image processing apparatus comprising a controller configured to:
   acquire objective image data, the objective image data being generated by optically reading a manuscript and representing an objective image including a character image indicating a character;
   determine whether (1) to transmit, to a predetermined communication apparatus, first image data based on the objective image data without executing a predetermined compression processing for the objective image data, or (2) to execute the predetermined compression processing for the objective image data first to generate second image data and then transmit the second image data to the predetermined communication apparatus, the determining being based on at least one of a property of the objective image data and a communication property
   in a case where it is determined to transmit the first image data without executing the predetermined compression processing: transmit the first image data, to the predetermined communication apparatus, the first image data representing the objective image, and
   first processed data from the predetermined communication apparatus, the first processed data including first character information regarding the character in the character image, the first character information being generated by executing a character recognition processing for the first image data; and
   in a case where it is determined to execute the predetermined compression processing first: execute, for the objective image data, the predetermined compression processing for reducing size of data representing the character image in the objective image data so as to generate the second image data, size of the second image data being smaller than size of the first image data,
   transmit the second image data to the predetermined communication apparatus, and
   receive second processed data from the predetermined communication apparatus, the second processed data including second character information regarding the character in the character image, the second character information being generated by executing the character recognition processing for the second image data.

2. The image processing apparatus according to claim 1, wherein the property of the objective image data is a size of the objective image data, and wherein in a case where the size of the objective image data is less than a reference value, the controller is configured to determine to transmit the first image data without executing the predetermined compression processing; and
   wherein in a case where the size of the objective image data is the reference value or more, the controller is configured to determine to execute the predetermined compression processing first.

3. The image processing apparatus according to claim 1, further comprising a first interface and a second interface, wherein the communication property is which of the first interface and the second interface is used for communication,
   wherein in a case where the first communication interface is used for the communication between the image processing apparatus and the predetermined communication apparatus, the controller is configured to determine to transmit the first image data without executing the predetermined compression processing; and
   wherein in a case where the second communication interface is used for the communication between the image processing apparatus and the predetermined communication apparatus, the controller is configured to determine to execute the predetermined compression processing first.

4. The image processing apparatus according to claim 3, wherein the first interface is a wired interface used in a wired communication, and the second interface is a wireless interface used in a wireless communication.

5. The image processing apparatus according to claim 1, wherein the communication property is a communication state,
   wherein in a case where the communication state between the image processing apparatus and the predetermined communication apparatus is a first communication state in which data is transmittable, the controller is configured to determine to transmit the first image data without executing the predetermined compression processing, and
   wherein in a case where the communication state between the image processing apparatus and the predetermined communication apparatus is a second communication state which is more restricted than the first communication state, the controller is configured to determine to execute the predetermined compression processing first.

6. The image processing apparatus according to claim 1, wherein the image processing apparatus is connected communicable with a terminal apparatus of a user and with a server as the predetermined communication apparatus,
   the controller is configured to further perform:
   acquire information for specifying whether the terminal apparatus has a function of executing the character recognition processing;
      transmit one of the first image data and the second image data to the terminal apparatus, if the terminal apparatus has the function of executing the character recognition processing; and
      transmit one of the first image data and the second image data to the server, if the terminal apparatus does not have the function of executing the character recognition processing.

7. The image processing apparatus according to claim 1, wherein the first processed data received from the predetermined communication apparatus includes the second image data obtained by executing the predetermined compression processing for the objective image data.

8. The image processing apparatus according to claim 1, wherein the predetermined compression processing includes: generating, by using the objective image data, a character data representing the character in the character image and a background image data representing a background image in which the character in the character image is removed from the objective image, compressing the character data and the background image data with different methods, respectively, and wherein the second image data includes the character data and the background image data compressed with the different methods, respectively.

9. An image processing apparatus comprising a controller configured to:
acquire objective image data generated by optically reading a manuscript, the objective image data representing an objective image including a character image indicating a character;
determine whether (1) to execute a character recognition processing first and then execute a predetermined compression processing, or (2) to execute the predetermined compression processing first and then execute the character recognition processing
in a case where it is determined to execute the character recognition processing first: execute a character recognition processing for the objective image data so as to generate first processed data, the first processed data including first character information regarding the character in the character image, and
execute, for the objective image data, the predetermined compression processing for reducing size of data representing the character image in the objective image data so as to generate predetermined compressed data, size of the predetermined compressed data being smaller than size of the objective image data; and
in a case where it is determined to execute the predetermined compression processing first: execute the predetermined compression processing for the objective image data so as to generate the predetermined compressed data, and
execute the character recognition processing for the predetermined compressed data so as to generate second processed data, the second processed data including second character information regarding the character in the character image.

10. The image processing apparatus according to claim 9, wherein in a case where a ratio occupied by the character image in the objective image is less than a reference value, the controller is configured to determine to execute the character recognition processing first, and
wherein in a case where the ratio occupied by the character image in the objective image is the reference value or more, the controller is configured to determine to execute the predetermined compression processing first.

11. The image processing apparatus according to claim 9, wherein in a case where a size of the objective image data is less than a reference value, the controller is configured to determine to execute the character recognition processing first, and
wherein in a case where the size of the objective image data is the reference value or more, the controller is configured to determine to execute the predetermined compression processing first.

12. A non-transitory computer-readable medium storing a program executable by an image processing apparatus, the program causing the image processing apparatus to:
acquire objective image data, the objective image data being generated by optically reading a manuscript and representing an objective image including a character image indicating a character;
determine whether (1) to transmit, to a predetermined communication apparatus, first image data based on the objective image data without executing a predetermined compression processing for the objective image data, or (2) to execute the predetermined compression processing for the objective image data first to generate second image data and then transmit the second image data to the predetermined communication apparatus, the determining being based on at least one of a property of the objective image data and a communication property
in a case where it is determined to transmit the first image data without executing the predetermined compression processing: transmit the first image data, to the predetermined communication apparatus, the first image data representing the objective image, and
receive first processed data from the predetermined communication apparatus, the first processed data including first character information regarding the character in the character image, the first character information being generated by executing a character recognition processing for the first image data; and
in a case where it is determined to execute the predetermined compression processing first: execute, for the objective image data, the predetermined compression processing for reducing size of data representing the character image in the objective image data so as to generate the second image data, size of the second image data being smaller than size of the first image data,
transmit the second image data to the predetermined communication apparatus, and
receive second processed data from the predetermined communication apparatus, the second processed data including second character information regarding the character in the character image, the second character information being generated by executing the character recognition processing for the second image data.

13. A non-transitory computer-readable medium storing a program executable by an image processing apparatus, the program causing the image processing apparatus to:
acquire objective image data generated by optically reading a manuscript, the objective image data representing an objective image including a character image indicating a character;
determining whether (1) to execute a character recognition processing first and then execute a predetermined compression processing, or (2) to execute the predetermined compression processing first and then execute the character recognition processing
in a case where it is determined to execute the character recognition processing first: execute the character recognition processing for the objective image data so as to generate first processed data, the first processed data including first character information regarding the character in the character image, and
execute, for the objective image data, the predetermined compression processing for reducing size of data representing the character image in the objective image data so as to generate predetermined compressed data, size of the predetermined compressed data being smaller than size of the objective image data; and
in a case where it is determined to execute the predetermined compression processing first: execute the predetermined compression processing for the objective image data so as to generate the predetermined compressed data, and execute the character recognition processing for the predetermined compressed data so as to generate second processed data, the second processed data including second character information regarding the character in the character image.

14. A system comprising an image processing apparatus and a predetermined communication apparatus configured to be communicable with the image processing apparatus, wherein the image processing apparatus includes a first controller configured to:

acquire objective image data, the objective image data being generated by optically reading a manuscript and representing an objective image including a character image indicating a character;

determine whether (1) to transmit, to a predetermined communication apparatus, first image data based on the objective image data without executing a predetermined compression processing for the objective image data, or (2) to execute the predetermined compression processing for the objective image data first to generate second image data and then transmit the second image data to the predetermined communication apparatus, the determining being based on at least one of a property of the objective image data and a communication property in a case where it is determined to transmit the first image data without executing the predetermined compression processing, transmit the first image data, to the predetermined communication apparatus, the first image data representing the objective image; and in a case where it is determined to execute the predetermined compression processing first:

execute, for the objective image data, the predetermined compression processing for reducing size of data representing the character image in the objective image data so as to generate the second image data, size of the second image data being smaller than size of the first image data, and transmit the second image data to the predetermined communication apparatus; and the predetermined communication apparatus includes a second controller configured to:

in a case where the predetermined communication apparatus receives the first image data from the image processing apparatus, execute a character recognition processing for the first image data so as to generate first processed data, the first processed data including first character information regarding the character in the character image, and transmit the first processed data to the image processing apparatus; and in a case where the predetermined communication apparatus receives the second image data from the image processing apparatus, execute the character recognition processing for the second image data so as to generate second processed data, the second processed data including second character information regarding the character in the character image, and transmit the second processed data to the image processing apparatus.

* * * * *

UNITED STATES PATENT AND TRADEMARK OFFICE
CERTIFICATE OF CORRECTION

PATENT NO. : 10,044,906 B2
APPLICATION NO. : 15/440382
DATED : August 7, 2018
INVENTOR(S) : Keisuke Fujita Page 1 of 1

It is certified that error appears in the above-identified patent and that said Letters Patent is hereby corrected as shown below:

In the Claims

Column 23, Claim 1, Line 32, should read:
receive first processed data from the predetermined communi-, Signed and Sealed this
Sixteenth Day of October, 2018

Andrei Iancu
*Director of the United States Patent and Trademark Office*